United States Patent [19]

Sirkar et al.

[11] Patent Number: 5,753,009
[45] Date of Patent: May 19, 1998

[54] METHOD AND APPARATUS FOR SELECTIVELY REMOVING A COMPONENT FROM A MULTICOMPONENT GAS/VAPOR MIXTURE

[75] Inventors: Kamalesh K. Sirkar, Berkeley Heights; Jyh-Yao Raphael Li, Parsippany, both of N.J.

[73] Assignee: New Jersey Institute of Technology, Newark, N.J.

[21] Appl. No.: 645,509

[22] Filed: May 14, 1996

[51] Int. Cl.$^6$ ........................................ B01D 53/22
[52] U.S. Cl. ................ 95/45; 95/50; 96/8; 96/13; 96/14
[58] Field of Search ................ 95/44, 45, 47–55; 96/4, 5, 7–14; 55/524

[56] References Cited

U.S. PATENT DOCUMENTS

| | | | |
|---|---|---|---|
| Re. 33,502 | 12/1990 | Gollan | 95/45 |
| 3,339,341 | 9/1967 | Maxwell et al. | 95/53 |
| 4,230,463 | 10/1980 | Henis et al. | 95/47 |
| 4,483,901 | 11/1984 | Okita et al. | 96/12 X |
| 4,553,983 | 11/1985 | Baker | 95/50 |
| 4,583,996 | 4/1986 | Sakata et al. | 95/50 |
| 4,696,686 | 9/1987 | Usami et al. | 96/13 |
| 4,734,106 | 3/1988 | Gollan | 55/16 |
| 4,750,918 | 6/1988 | Sirkar | 95/44 |
| 4,789,468 | 12/1988 | Sirkar | 210/137 |
| 4,824,444 | 4/1989 | Nomura | 96/12 X |
| 4,880,441 | 11/1989 | Kesting et al. | 95/47 |
| 4,881,955 | 11/1989 | Bikson et al. | 95/54 |
| 4,900,626 | 2/1990 | Fabre | 95/52 X |
| 4,906,256 | 3/1990 | Baker et al. | 95/48 |
| 4,921,612 | 5/1990 | Sirkar | 210/644 |
| 4,931,181 | 6/1990 | Blume et al. | 95/51 X |
| 4,973,434 | 11/1990 | Sirkar et al. | 264/4 |
| 4,990,255 | 2/1991 | Blume et al. | 96/13 X |
| 4,997,569 | 3/1991 | Sirkar | 210/637 |
| 5,002,590 | 3/1991 | Friesen et al. | 95/52 |
| 5,013,437 | 5/1991 | Trimmer et al. | 95/47 X |
| 5,032,148 | 7/1991 | Baker et al. | 95/50 |
| 5,053,132 | 10/1991 | Sirkar | 210/500.23 |
| 5,071,451 | 12/1991 | Wijmans | 95/48 X |

(List continued on next page.)

FOREIGN PATENT DOCUMENTS 62-033521  2/1987  Japan ........................................ 95/45

OTHER PUBLICATIONS

Baker, et al., J. Membrane Sci., 31, 259–71 (1987).
A.K. Guha et al., Ind. Eng. Chem. Res., 31, 593–604 (1992).
Henis et al. (1981) J. Membrane Sci., 8, 233–46.
Kimmerle et al., J. Membrane Sci., 36, 477–88 (1988).
Pinnau et al., J. Membrane Sci., 37, 81–8 (1988).
Sidhoum et al. (1988) AIChE J. 34:417–25.
Strathmann et al., Pure and Applied Chem., 58(12), 1663–8 (1986).

*Primary Examiner*—Robert Spitzer
*Attorney, Agent, or Firm*—Klauber & Jackson

[57] ABSTRACT

A device and method for selectively removing one or more components from a multicomponent gas/vapor mixture by membrane fractionation. The membrane fractionation gas removal system preferably comprises: a feed chamber which contains the gas/vapor mixture; at least one porous membrane having a first side which contacts the gas/vapor mixture in the feed chamber, and a second side; at least one nonporous membrane having a first side which contacts the second side of the at least one porous membrane, and a second side, the nonporous membrane having a permeability selective to one or more components; an exit chamber connected to the second side of the at least one nonporous membrane such that the component exiting the nonporous gas enters the exit chamber; and an evacuation member connected to the exit chamber for evacuating one or more components from within the exit chamber. The one or more components are transported through the porous membrane, adsorbed out of the gas/vapor multicomponent gas mixture onto the surface of the porous membrane, through the nonporous membrane, and into the exit chamber. The one or more components preferably condense within the pores of the at least one porous membrane.

59 Claims, 19 Drawing Sheets

U.S. PATENT DOCUMENTS

| | | | |
|---|---|---|---|
| 5,085,776 | 2/1992 | Blume et al. | 96/13 X |
| 5,089,033 | 2/1992 | Wijmans | 95/49 X |
| 5,108,464 | 4/1992 | Friesen et al. | 95/52 |
| 5,199,962 | 4/1993 | Wijmans | 95/48 X |
| 5,205,843 | 4/1993 | Kaschemekat | 95/49 X |
| 5,236,474 | 8/1993 | Schofield et al. | 95/47 |
| 5,256,296 | 10/1993 | Baker et al. | 95/45 X |
| 5,281,254 | 1/1994 | Birbara et al. | 95/44 |
| 5,282,964 | 2/1994 | Young et al. | 95/45 X |
| 5,354,469 | 10/1994 | Babcock | 96/12 X |
| 5,501,722 | 3/1996 | Toy et al. | 95/45 X |

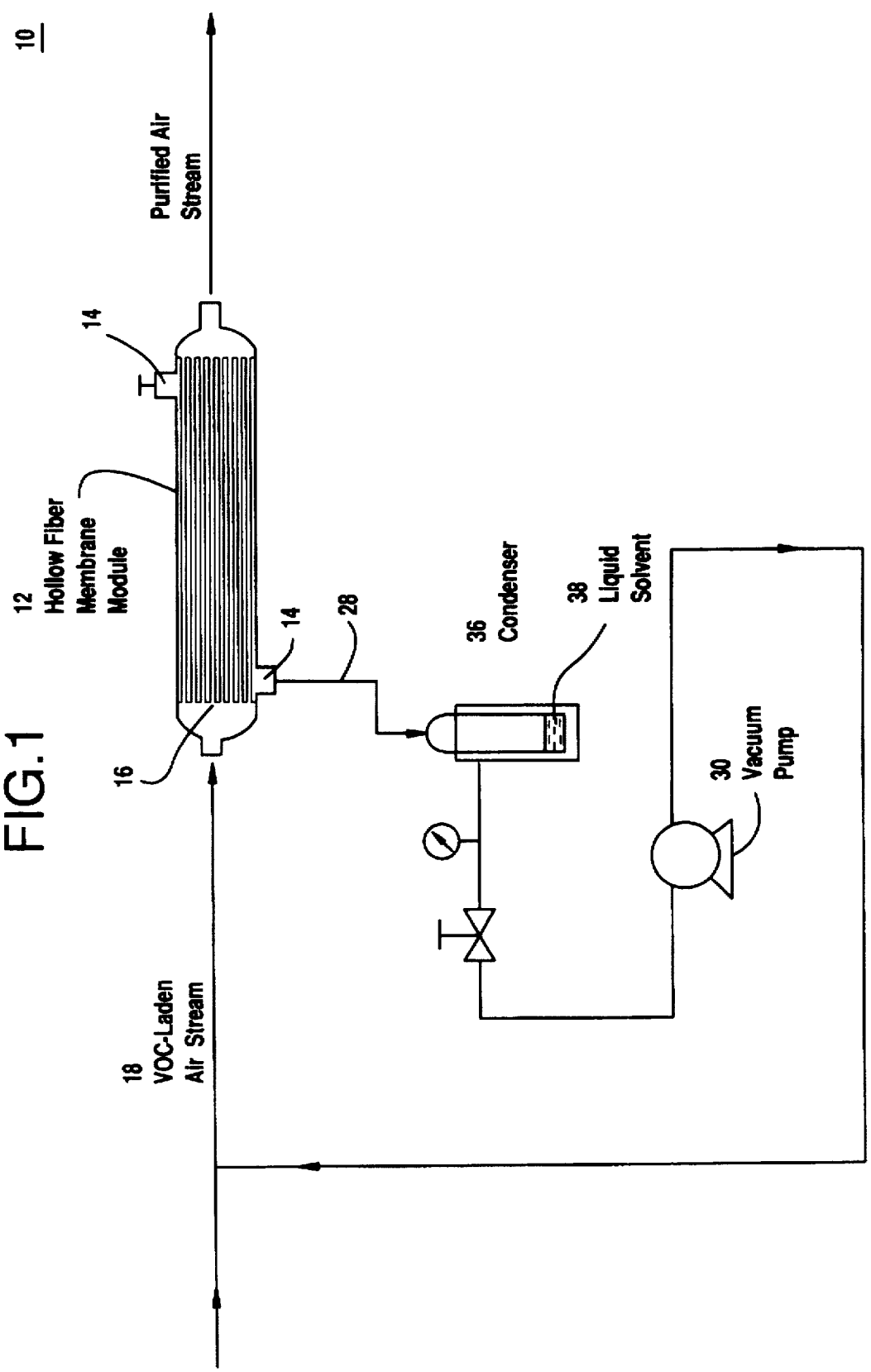

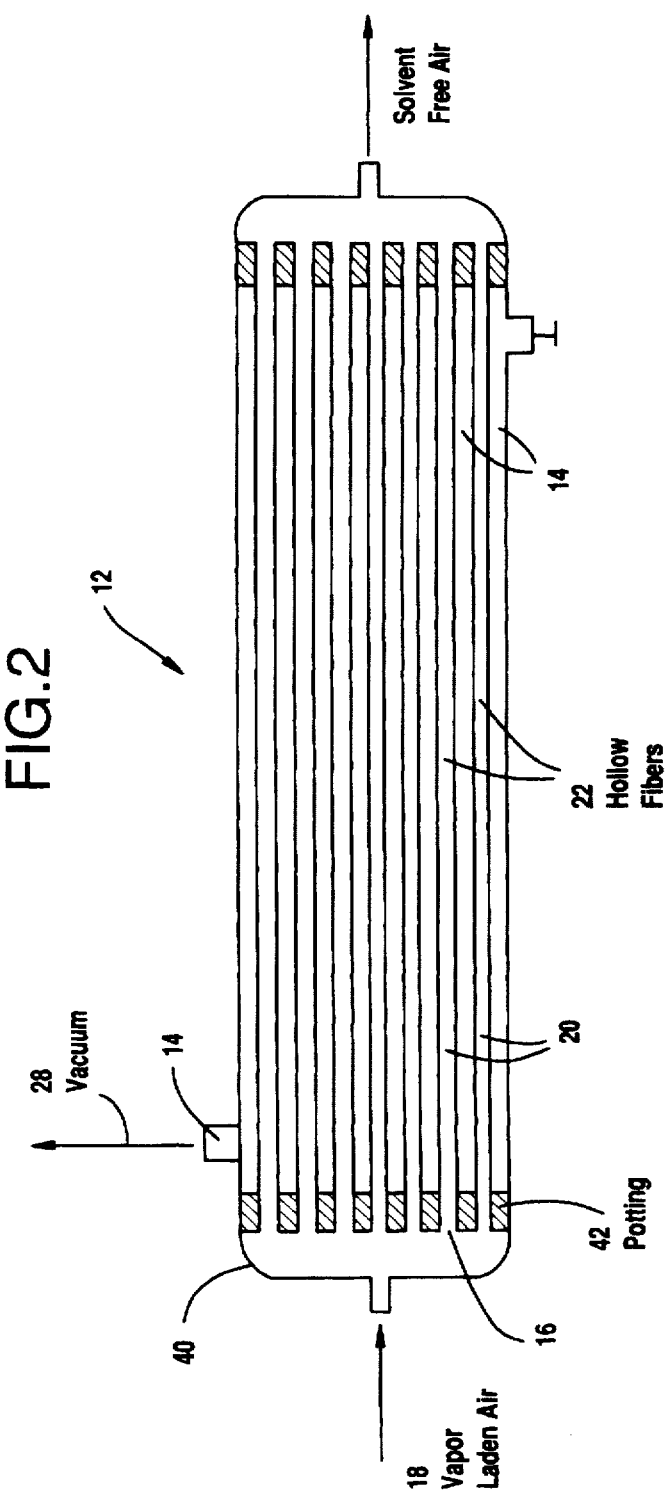
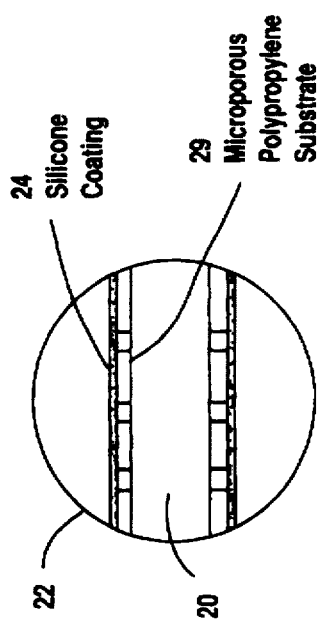

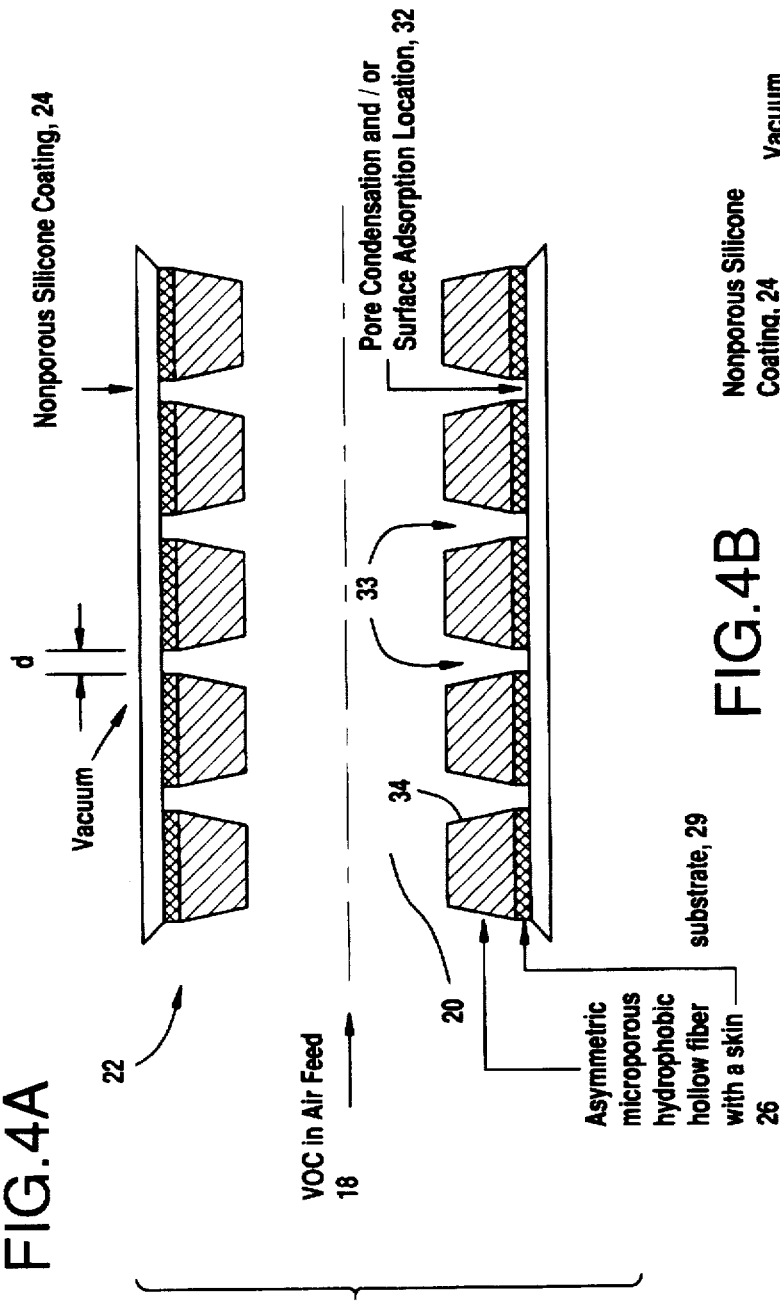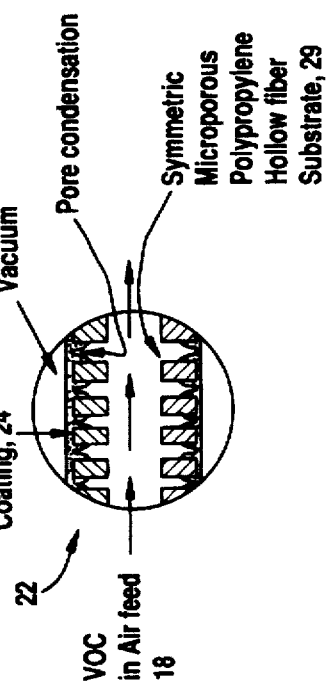
FIG. 4A
FIG. 4B

- ● percent removal, tube side
- ○ percent removal, shell side
- □ outlet concentration, shell side
- ■ outlet concentration, tube side

METHOD AND APPARATUS FOR SELECTIVELY REMOVING A COMPONENT FROM A MULTICOMPONENT GAS/VAPOR MIXTURE

FIELD OF THE INVENTION

The present invention relates to selectively removing a gas or vapor component from a multicomponent gas/vapor mixture by a membrane fractionation system and, more particularly, but not by way of limitation, to the removal of volatile organic compounds from air, nitrogen, or other gases and gas mixtures.

BACKGROUND OF THE INVENTION

The separation and removal of one gas from a mixture of gases is an important process with many applications. One particular area of concern is the removal of condensible volatile organic compounds (VOCs) from air streams, nitrogen streams and other gas streams in industrial and commercial processes and facilities. For example, VOCs used as carrier liquids and dissolving agents in many industrial processes are vaporized and escape routinely into the atmosphere via process exhaust air streams. The VOCs in such air streams are a serious environmental problem. If the air, $N_2$, or gas stream is to be safely released, the VOCs must first be removed from such discharges to control environmental pollution. VOCs are precursors to ground level ozone, a major component in the formation of smog. Moreover, under the Clean Air Act Amendments of 1990, thousands of currently unregulated sources will be required to reduce or eliminate VOC emissions. In addition, sources that are currently regulated may seek to evaluate alternative VOC control strategies to meet considerably stricter regulatory requirements.

There are a number of processes and treatment strategies to address this problem: carbon adsorption, condensation, absorption, incineration, catalytic oxidation, biofiltration, UV oxidation, and membrane fractionation. A comparative review of many such processes vis-a-vis membrane fractionation is available in Baker and Wijmans (U.S. Pat. No. 5,032,148). These technologies have their own disadvantages. Incineration produces other dangerous compounds. Condensation systems and absorption systems are bulky, costly, and experience flooding and loading problems. Scrubbing solvents, absorption materials, and catalysts must all be regenerated or replaced. Biofiltration requires bulky equipment which typically cannot handle a variety of VOC mixtures. There is a need for a simple, cheap, reliable process that can be used at any scale and that can reduce the levels of VOCs substantially regardless of the nature of the VOC. A preferred embodiment of the present invention relates to an improved membrane fractionation process for removal of VOCs from air or other gas streams.

Membrane processes for recovering organic vapors from air by selective permeation of VOCs through ultrathin silicone rubber composite membranes subjected to a vacuum on the permeate side are well described in Baker (U.S. Pat. No. 4,553,983), Baker et al. (U.S. Pat. No. 4,906,256), Baker and Wijmans (U.S. Pat. No. 5,032,148), Wijmans (U.S. Pat. No. 5,089,033), Wijmans (U.S. Pat. No. 5,199,962) and Kaschemekat et al. (U.S. Pat. No. 5,205,843). The nature of the ultrathin silicone rubber composite membrane structure, modules, and the modes of operation in such processes are provided in detail in the above references as well as in Blume et al. (U.S. Pat. No. 4,931,181), Blume et al. (U.S. Pat. No. 4,990,255), and Blume et al. (U.S. Patent No. 5,085,776).

The ultrathin rubbery composite membrane structure employed for vapor permeation or vapor separation in the above references consists of a thin nonporous rubbery polymeric layer of thickness between 0.1 to 10 μm dipcoated on a relatively porous (surface porosity $\geq 0.10$) solvent resistant substrate supported on a fabric web layer of thickness 100–125 μm made of, for example, polyester or polypropylene, etc. The feed gas (e.g. air or $N_2$) containing VOCs flows over the top surface of the rubbery nonporous polymeric layer (quite often a silicone rubber) at, say, atmospheric pressure as vacuum is pulled on the other side of the membrane through the nonporous rubbery coating membrane and then through the porous substrate and the polyester support web layer. The permeated stream, highly enriched in the VOCs, is drawn through a condenser by a vacuum pump when the feed gas is at, say, atmospheric pressure. This provides the partial pressure differential driving force for permeation of individual VOCs as well as other species present in the gas mixture.

An alternate configuration employs asymmetric microporous hollow fibers with the silicone coating on the skin-side of the hollow fiber exposed to VOC-contaminated air and vacuum pulled through the porous substrate, as discussed in Kimmerle et al., "Solvent Recovery from Air," J. Membrane Sci., 36, 363 (1988), and Strathmann et al., "Development of Synthetic Membranes for Gas and Vapor Separation," Pure and Applied Chem., 58 (12), 1663 (1986). "Skin-side" as used herein refers to the side of the substrate on which a "skin" of substrate material forms during membrane manufacture, and does not refer to any added coating or any other added membrane material. The porous substrate used in such composite membranes in flat or hollow fiber form has been generally polysulfone as seen in Pinnau et al., "Gas Permeation through Composite Membranes," J. Membrane Sci., 37, 81 (1988). Solvent resistance and appropriate porosity are two of the most important characteristics of the porous substrates in such a process.

An additional feature of significant importance in vapor permeation-separation from $N_2$/air through composite silicone membranes is the interaction of pressure drop and permeation resistance. Normally, ultrathin nonporous silicone coating membranes (thickness between 0.1–2 gm) are so highly permeable to organic vapors that conventional porous substrates (of, say, polysulfone) have been found to introduce significant pressure drop in the permeate stream; this unexpected resistance from the porous substrate results in a large loss of selectivity between the VOC and, for example, $N_2$. Pinnau et al. (1988) have therefore employed a much thicker coating of silicone so that permeation resistance through the silicone skin is the controlling resistance as opposed to the resistance of the nonselective porous substrate. This, of course, leads to a decrease in the achievable VOC flux through the membrane.

The citation of any reference herein should not be construed as an admission that such reference is available as prior art to the invention.

SUMMARY OF THE INVENTION

The present invention provides a device and method for selectively removing one or more components from a multicomponent gas/vapor mixture by membrane fractionation. More particularly, the invention provides for separating the gas/vapor component from a carrier gas/vapor or gas/vapor mixture.

In a preferred embodiment, the membrane fractionation gas removal system preferably comprises: a feed chamber which contains the gas/vapor mixture; at least one porous membrane having a first side which contacts the gas/vapor mixture in the feed chamber, and a second side; at least one nonporous membrane having a first side which contacts the second side of the at least one porous membrane, and a second side, the nonporous membrane having a permeability selective to one or more gas/vapor components, an exit chamber connected to the second side of the at least one nonporous membrane such that the components exiting the nonporous membrane enter the exit chamber; and an evacuation means connected to the exit chamber for evacuating the component from within the exit chamber. Preferably, the component is transported through the at least one porous membrane, and adsorbed out of the gas/vapor multicomponent mixture onto the surface of a microporous membrane, resulting in possible condensation of the component, prior to transport through the nonporous membrane and into the exit chamber.

The evacuation means preferably includes a vacuum means for maintaining a vacuum pressure in the exit chamber, and a condensing means for condensing the component which exits the exit chamber. The vacuum means may be passive (i.e., no vacuum applied) if the feed gas is at a relatively high pressure differential with the evacuation means, preferably ranging from greater than about 1 to 20 atmospheres.

Alternatively, the evacuation means may comprise a sweep gas or sweep vapor means for continuously or periodically passing a sweep gas through the permeate side of the system. For example, steam vapor can be used to strip the component.

The at least one porous membrane has a plurality of pores having a pore size which preferably promotes the adsorption and more preferably adsorption and condensation, of the component within the pores and is permselective with respect to that component. The porous membrane is preferably an asymmetric hydrophobic microporous membrane made of a polymeric material and comprised of at least one hollow porous tube having a lumen and a membrane thickness. The first side of the microporous membrane comprises an inner surface of the hollow porous tube, and the second side of the microporous membrane comprises an outer surface of the hollow porous tube. The feed chamber corresponds to the lumen of the hollow porous tube, and the exit chamber surrounds the hollow porous tube in a shell-and-tube arrangement, such that the exit chamber is the shell.

The at least one nonporous membrane comprises at least one nonporous rubbery skin membrane fabricated from a thermoplastic material. The nonporous rubbery skin membrane is preferably plasma polymerized onto the second side of the at least one porous membrane and more preferably is fabricated from ultrathin plasma polymerized nonporous silicone rubber.

The preferred method for selectively removing one or more components from a multicomponent gas/vapor mixture preferably comprises the steps of: (a) introducing the gas/vapor mixture into the feed chamber; (b) contacting the gas/vapor mixture in the feed chamber with the first side of the at least one porous membrane; (c) evacuating the exit chamber. Thus, for example, a component (or more than one component) of the gas/vapor mixture in the feed chamber is transferred through the first side of the at least one porous membrane, across the at least one porous membrane, through the second side of the at least one porous membrane. Prior to exiting the second side of the at least one porous membrane, the component preferably is adsorbed out of the gas/vapor mixture onto the surface of the porous membrane, possibly resulting in condensation of the component, and thereafter the component passes through the nonporous membrane into the exit chamber. Evacuation of the permeate may be effected by a vacuum means or a sweep gas or sweep vapor means, or may be self-evacuating if feed gas operating pressures are sufficiently high to induce permeate flow out of the exit chamber. When the component is present in the feed chamber in sufficient concentrations and if sufficient adsorption occurs within the porous membrane, the method further comprises the step of condensing the component into a liquid phase which resides between the first side and the second side of the at least one porous membrane, i.e., in the pores of the porous membrane. In any event, the concentration of the component and the total pressure on the permeate side should be maintained at a level low enough to provide a partial pressure difference acting as a driving force through the nonporous membrane.

If a condensing means is included in the apparatus, the method further comprises the step of condensing the component (or components) exiting the exit chamber.

In another preferred embodiment, the present invention contemplates a membrane fractionation gas removal system for removing volatile organic compounds from a multicomponent gas/vapor mixture, the system comprising: a plurality of hydrophobic porous hollow fibers, each fiber comprising a lumen having a surface, and an outer surface, the fibers being comprised of a polymeric material; a nonporous rubbery skin membrane fixedly disposed on the outer surface of the plurality of hydrophobic porous hollow fibers, the membrane being substantially fabricated with a thermoplastic material which is permselective to a VOC component of the mixture; and an exit chamber surrounding the plurality of hydrophobic porous hollow fibers in a shell-and-tube arrangement, such that the exit chamber is the shell. The mixture is introduced into the lumen of the plurality of hydrophobic porous hollow fibers, whereby the volatile organic compound (or compounds) is transported through the porous hollow fibers and adsorbed out of the multicomponent gas/vapor mixture onto the surface of the pores within the porous hollow fibers, possibly resulting in condensation of the compound(s) within the porous hollow fibers, prior to transport through the nonporous rubbery skin membrane and into the exit chamber.

The system further preferably comprises a vacuum means connected to the exit chamber for maintaining a vacuum pressure in the exit chamber. As noted above, the vacuum means may be passive if the feed gas is at a high pressure. Alternatively, permeate gas may be evacuated by a sweep gas or sweep vapor means for continuously or periodically passing a sweep gas or sweep vapor (such as $N_2$ or steam) through the permeate side of the system.

The plurality of hydrophobic porous hollow fibers are preferably comprised of an asymmetric hydrophobic microporous membrane material, and further comprise a plurality of pores disposed throughout the hollow fibers which have a pore size and shape which promotes adsorption and condensation of the volatile organic compound(s) within the pores, whereby the hollow fibers have the capability of adsorbing and condensing the volatile organic compound(s) in the plurality of pores.

The nonporous rubbery skin membrane is preferably plasma polymerized onto the hollow fibers. The nonporous rubbery skin membrane is preferably ultrathin plasma polymerized nonporous silicone rubber.

Experimental results show that introducing feed gas into the tube side of a hollow fiber module (HFM) having an ultrathin nonporous plasma polymerized silicone coating over the outside surface of a porous substrate in a shell-and-tube arrangement is very effective in removing various VOC vapors, including toluene, methanol, methylene chloride, and acetone, from feed $N_2$ and air gas streams. A very small HFM having a length of 25 cm and containing 50 fibers can remove 97–98% of the VOC from a feed stream at a flow rate of 60 cc/min. In the case of acetone, a lower gas flow rate provided this level of efficiency. At a flow rate of 30 cc/min, 98%+ acetone removal was achieved easily. The HFM is especially suitable for high feed inlet VOC concentrations. The concentration of methanol in a feed stream of 50,000 ppmv methanol and 60 cc/min flow rate was reduced to 221 ppmv, thus achieving a 99.6% VOC removal. Replacing $N_2$ by air merely reduces the selectivity somewhat, since $O_2$ is more permeable than $N_2$ through the membrane.

In short, the present inventors have unexpectedly found that feeding the gas mixture through the fiber bore and pulling a vacuum on the shell side results in a much greater separation performance compared to feeding the gas mixture on the shell side. More surprisingly, this level of efficiency did not impair the integrity of the silicone rubber membrane. Indeed, it has been found that the HFM may be effectively utilized for higher pressure feed streams as well, up to 20 atmospheres.

The Examples infra show that the percent toluene removal was considerably lower in the shell side feed mode, as disclosed in the prior art, compared to the tube side feed mode of the present invention at two gas flow rates, demonstrating the unexpected superiority of the tube side feed of the invention. Toluene flux increased dramatically as the feed gas flow rate increased, resulting from a rapid increase in toluene permeance at higher toluene concentrations. The percent VOC removal at a given feed flow rate also increases with feed inlet VOC concentration, since toluene permeance increases rapidly with concentration. At a given inlet concentration, percent removal was reduced as feed flow rate increased. The $N_2$ flux appeared to decrease slightly with increasing toluene concentration. This performance characteristic was unexpected.

Experiments with methanol showed that the percent removal of methanol was reduced as the feed flow rate was increased, similar to the phenomenon observed in toluene removal experiments. The percent removal of methanol increased as the feed concentration was increased at feed flow rates of 60 and 150 cc/min. At very high feed flow rates of 300 and 560 cc/min, the percent removal of methanol did not vary with the feed concentration. $N_2$ flux decreased considerably as the feed methanol concentration was increased for every feed flow rate tested due to a decrease in $N_2$ permeance.

Experiments with acetone showed that percent removal of acetone was relatively unaffected by the feed concentration level of acetone. Correspondingly, the feed outlet concentration of acetone increased almost linearly with an increase in feed inlet concentration. The rate of increase was sharper at higher flow rates. The acetone flux increased strongly with the acetone feed inlet concentration. The $N_2$ flux decreased considerably with increasing acetone vapor concentration, similar to methanol and toluene.

Experiments with methylene chloride showed that 98%+ removal of methylene chloride could be easily achieved at inlet concentrations of 998 and 6000 ppmv for gas flow rates as high as 1.2 cc/min/fiber. Methylene chloride flux increased with VOC concentration and flow rate, similar to other VOCs. $N_2$ permeance decreased with increasing VOC concentration.

Experiments were conducted with the present invention used in tandem with an absorption module and a stripper module as described in U.S. application Ser. No. 08/248, 062, which is incorporated herein by reference in its entirety. The methylene chloride/gas mixture was fed into the apparatus of the invention. The outlet gas was fed into the absorption module operated with a stripper module. In this embodiment, a concentration of methylene chloride in a 60 cc/min feed stream was reduced 3000-fold, from 6000 ppmv to only 2 ppmv.

Accordingly, it is a principal object of the present invention to provide an improved membrane fractionation process, including a method and an apparatus, for removal of a vapor or gas (or vapors or gases) from a multicomponent gas mixture.

It is another object of the invention to provide a new membrane structure for removal of condensible gases and vapors from air/$N_2$ or other gas/vapor mixture streams.

It is yet another object of the invention to provide an improved membrane fractionation process for removal of VOCs from air, nitrogen, or other gas/vapor mixtures or streams.

It is an additional object of the invention to provide such a device which is economical to construct.

It is yet another object of the invention to provide such a device which is compact.

Other objects of the present invention, as well as particular features, elements, and advantages thereof, will be elucidated in, or be apparent from, the following description and the accompanying drawing figures.

BRIEF DESCRIPTION OF THE DRAWINGS

Understanding of the present invention and the various aspects thereof will be facilitated by reference to the accompanying drawing figures, submitted for purposes of illustration only and not intended to define the scope of the invention, on which:

FIG. 1 is a schematic representation of a preferred embodiment of the gas separation system of the present invention having a shell-and-tube configuration.

FIG. 2 is a schematic representation of a hollow fiber module in a preferred embodiment.

FIG. 3 illustrates an ultrathin nonporous silicone coating on the outside surface of the microporous hollow fibers represented in FIG. 1.

FIG. 4 is a cross-sectional representation of the hollow fiber pores of a preferred embodiment of the present invention showing the location of possible pore condensation.

DETAILED DESCRIPTION OF THE INVENTION

Figure 5:
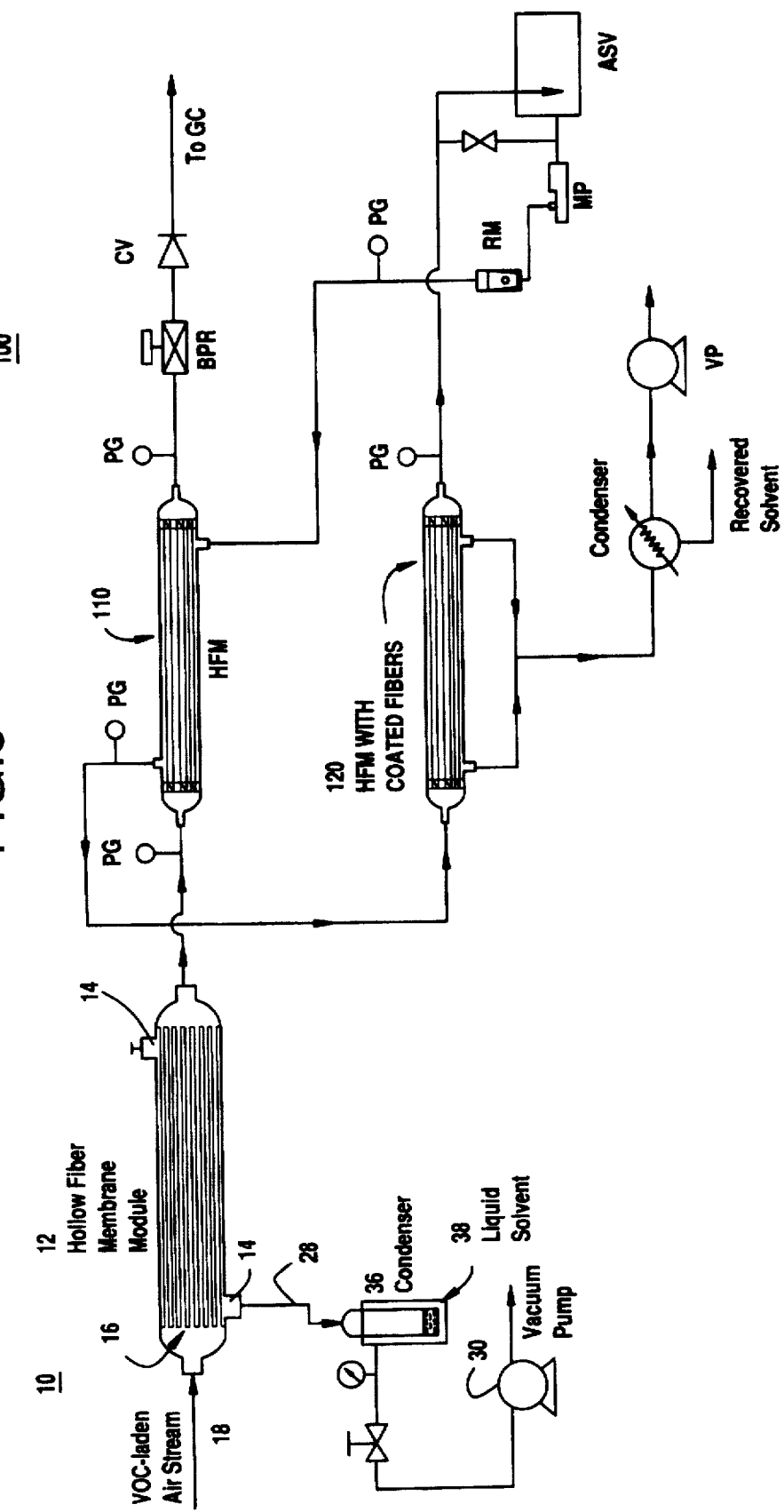
FIG. 5 is a schematic representation of a preferred embodiment of the present invention in tandem with an absorption module operated with a stripper as disclosed in U.S. application Ser. No. 08/248,062, filed May 23, 1994.

In a preferred embodiment, the membrane fractionation gas removal system comprises: a feed chamber which contains the gas/vapor mixture; at least one porous membrane having a first side which contacts the gas/vapor mixture in the feed chamber, and a second side; at least one nonporous membrane having a first side which contacts the second side of the at least one porous membrane, and a second side, the nonporous membrane having a permeability selective to the first component; an exit chamber connected to the second side of the at least one nonporous membrane such that the first component exiting the nonporous membrane enters the exit chamber; and an evacuation means connected to the exit chamber for evacuating the first gas from within the exit chamber. Preferably, the component is transported through the at least one porous membrane, and adsorbed out of the gas/vapor multicomponent mixture onto the surface of the microporous membrane, resulting in possible condensation of the component, prior to transport through the nonporous membrane and into the exit chamber.

As used herein, the term "gas/vapor component" refers to a compound, preferably a VOC, which can be found in a gaseous state mixture with a carrier gas, such as $N_2$, air, argon, carbon dioxide, methane, etc. Preferably the gas/vapor component is a vapor, i.e., in the gaseous state below the gas-liquid critical point. Vapors are more readily adsorbed and condensed on an adsorbent-saturated surface, such as an asymmetric nanosized pore (6–50 Å) and nonporous membrane interface in a composite membrane of the invention.

Normally at high feed VOC concentrations, a rubbery membrane skin swells due to high sorption of VOC by the nonporous silicone rubber coating. This swelling increases nitrogen permeance and so reduces membrane selectivity as discussed in Baker (U.S. Pat. No. 4,553,983). However, pore condensation creates a layer of pure organic liquid through which $N_2$ must first diffuse. Therefore, at high VOC concentrations $N_2$ flux and permeance are either constant or considerably reduced due to VOC condensation, and thus the VOC-$N_2$ selectivity is considerably enhanced by the present invention under these conditions. To the contrary, in a prior art configuration having the feed gas on the nonporous membrane side, neither adsorption nor condensation will occur, and the swelled membrane will simply admit more nitrogen or air. In other words, the present invention advantageously addresses and overcomes deficiencies inherent in prior art processes.

The present invention is enhanced by other considerations as well. The VOC mole fraction in the permeate in any such process is much higher than that in the feed. In theory, the vacuum level on the permeate side cannot be too high or strong. However, as production of a high vacuum is prohibitively expensive for industrial processes, a low vacuum is preferred and fully effective. Typical hollow fibers such as those used in the experimental apparatus described below can withstand tube side pressurization up to a pressure difference of 200–300 psig. If the feed VOC concentration is high, the membrane efficiency will not be fully utilized unless the vacuum level is very high. One way to solve the problem is to have a controlled introduction of sweep $N_2$ on the permeate side to reduce the permeate partial pressure of the VOC. This will overcome the limitation that the VOC concentration in the feed gas can be only 20,000 ppmv as described in Baker '983.

Thus, as seen in FIG. 1, the evacuation of the permeate 28 from the shell side 14 may be accomplished by a vacuum pump 30 or a sweep gas or sweep vapor (such as steam). A combination of vacuum means and sweep gas/vapor means may also be used. In addition, operation of a vacuum pump or a sweep gas may not be necessary if feed gas is forced into the device 10 at a sufficiently high pressure, e.g., up to 10 to 15 atmospheres, although levels up to 20 atmospheres are possible. In any case, the permeate 28 may be passed through a condenser 36 which may contain a liquid solvent 38, which is substantially the condensed component, e.g., the VOC.

Because the VOC-containing feed gas mixture flows over the non-skin side of the membrane, i.e., the side having the microporous substrate to promote pore adsorption-cum-condensation, and because the permeate side total pressure is usually lower than the feed gas pressure, it is important that a very good bond exists between the rubbery VOC-selective coating/skin 24 and the asymmetric hydrophobic microporous membrane substrate 29. Otherwise, delamination and membrane rupture would result. Plasma polymerized membranes of, for example, silicone or silicone copolymers, on symmetric porous/microporous and asymmetric substrates are particularly suitable due to the excellent bonding developed between the silicone skin and the substrate during plasma polymerization. One particular suitable example is the plasma polymerized silicone coating membrane of Applied Membrane Technology, AMT, Inc., Minnetonka, Minn.

The microporous hydrophobic symmetric (Celgard®-type) or asymmetric substrate supports 29 for the nonporous thin coating 24 may include, but are not limited to, membranes made of polysulfone, polyetherimide, polyvinylidene fluoride, polyamide, polypropylene, polyethylene, polymethylpentene, and polytetrafluoroethylene, etc. These materials should have significant solvent resistance but encourage solvent surface adsorption.

Good candidates for the material for the nonporous ultrathin VOC-selective rubbery coating membrane 24 include, but are not limited to, polydimethylsiloxane (silicone rubber), nitrile rubber, neoprene rubber, silicone-polycarbonate and all other copolymers, fluoroelastomers, polyurethane, polyvinylchloride, polybutadiene, polyolefin elastomers, polyesters, and polyethers. These materials must be thermoplastic. Those that can be applied via plasma polymerization are especially preferred. The rubbery membrane 24 must develop good bonding with the polymeric microporous hydrophobic symmetric or asymmetric support substrate membrane 29 so that it can withstand the pressure difference imposed on the skin through the so-called porous support/substrate.

The deposition and bonding of the rubbery membrane 24 can create a non-porous asymmetric narrowed region at pore end in contact with the nonporous membrane. In another embodiment, material is deposited in the pores to facilitate pore surface adsorption and condensation.

The thickness of the rubbery membrane can be in the range from 250 Å up to 25 µm. Thicknesses ranging from just under 1 µm to 3 µm have been used in removing VOCs.

Putting oil absorbents or other absorbents in pores greatly increases selectivity, although flux decreases. The oil must be nonvolatile, such as polyethylene glycol, polypropylene glycol. Examples of suitable absorbent liquids are dimethyl/polymethyl siloxanes, mineral oils, paraffinic oils, vegetable oils, heat transfer fluids, aqueous solutions of alkanolamines, hindered amines, pure polar hydrocarbons (n-methylpyrollidone, dimethylsulfoxide, sulfolane, etc.), and synthetic hydrocarbon solvents. More specifically, the examples may include silicone oil, Paratherm, Syltherm, Dowtherm, Calflo, Therminol, Syntrel, Isopar, and Norpar.

If the feed gas has a relatively high concentration of the component to be removed, as the component is adsorbed onto the porous membrane, the component concentration is reduced along the path of the feed gas through the system. This could result in increased $N_2$ flux through the pores closer to the feed gas exit since these pores will contain less condensed gas, which allows greater $N_2$ flux. Therefore, a component (e.g., VOC) selective coating as the nonporous membrane is preferred to avoid large values of $N_2$ flux.

Plasma polymerization is one of the preferred ways to develop bonding, although dip-coating, interfacial polymerization, coating, and other methods of depositing and bonding could be used.

Plasma polymerization develops a very thin layer. Other techniques will develop a non-porous skin with somewhat lower bond strength, necessitating lower operating pressure differentials. Membrane thicknesses may be smaller with interfacial polymerization. Dip-coating will also work, albeit with a much lower bond strength. These other techniques are preferably used with sweep gases.

Plasma polymerization deposits nonporous material onto, and into, the pores of the porous substrate, creating a very fine capillary in the pore, which extraordinarily increases the selectivity of the composite membrane. Thus, casting a thin layer of nonporous material such as silicone rubber onto a microporous substrate or porous substrate having micropores such as a hydrophobic ultrafiltration membrane results in a novel permselective material.

The bore-side flow of feed in a hollow fiber module (HFM) having an ultrathin nonporous plasma polymerized silicone coating on a microporous polypropylene substrate is very effective in removing VOCs from feed $N_2$ gas streams. The HFM is especially suitable for high feed inlet VOC concentrations. Passing the feed gas through the fiber bore and pulling a vacuum on the shell side results in a much better separation performance compared to passing the feed gas on the shell side.

The above-mentioned test results suggest that a preferred embodiment which includes asymmetric hydrophobic microporous membranes 29, i.e. substrate, having a nonporous rubbery skin membrane 24 over the skin side 26 of the asymmetric microporous membrane 29 will be particularly suitable for removal of VOCs from gas streams 18 fed to the non-skin side 34 of the membrane 29, as illustrated in FIG. 4. The asymmetric hydrophobic microporous membrane 29 should have pore sizes in the skin region of 6–50 Å. Pores of this size will promote pore condensation of VOCs. Indeed, if the pore size is vanishingly small, condensation could occur in the pores without the addition of a silicone layer.

The extent of pore condensation (as well as pore surface adsorption which includes the surface interaction between membrane and vapor or condensible gas) depends on the partial pressure of the VOC in the gas stream. When the partial pressure of the VOC is too low, there will not be any pore condensation in the 6–50 Å pores in the skin of the asymmetric microporous membrane 29. Under these conditions, the presence of a nonporous VOC-selective rubbery membrane coating or skin 24 over the skin region 26 of the asymmetric microporous membrane 29 is particularly useful. The overall fiber 22 will still be VOC selective due to this nonporous rubbery VOC-selective skin 24 on the asymmetric microporous membrane substrate 29 at low VOC partial pressures. Since one cannot control for the possibility of defects in such a membrane, a permselective coating is necessary. A permselective nonporous coating deposited on a microporous substrate having a pore size of 15 Å on the outer surface could, for example, result in one layer of VOC molecules adsorbed onto the porous substrate pore walls thereby reducing the effective pore diameter to about 6 Å.

Pore condensation cannot be achieved above the critical temperature of a component. For example, at 28° C. carbon dioxide can be compressed and condensed, while at 33° C., no liquefaction of carbon dioxide would occur upon compression. This property also determines whether a component will condense on the surface of a porous/microporous membrane subsequent to adsorption. A component under given operating conditions of temperature, pressure, membrane material, nonporous coating, effective pore size, etc., which does adsorb and which may condense on the surface of the pores, may be labeled as a vapor, a condensible vapor, or a condensible gas, and is generally referred to herein as a "component" which is to be separated from a gas/vapor multicomponent gas mixture. Thus, it should be understood that the gas/vapor multicomponent gas mixture contains at least one component which is adsorbed, and possibly condenses, onto the pore surfaces, and at least one of the component which does not, wherein the latter may be referred to simply as a gas.

A self-supporting hollow fiber-based device 12 as configured in the preferred embodiment, can pack 7–10 times larger membrane surface area than spiral-wound devices. However, it should be noted that the membranes may assume various sizes and shapes without departing from the scope of the invention. For example, the porous membrane may assume the configuration of a spiral-wound device, a baffled device, or a flat membrane device having flat porous and nonporous layers which abut each other. Furthermore, the device may assume any of various orientations, e.g., horizontal, vertical, or oblique, to name a few.

It should also be noted that the combination of the porous and nonporous membranes may be labeled for convenience variously as a "composite membrane", or more aptly a "thin film composite membrane", or a "single permselective membrane having a porous side with continuous pores or pits or cavities, and a nonporous side", because an embodiment which utilizes an ultrathin layer of silicone rubber or the like on a porous substrate might appear to be a single membrane. Likewise, a porous membrane in the form of a hollow fiber which is coated with the ultrathin nonporous layer may be referred to as a coated fiber.

The source of the feed gas mixture may contain a gas stream and volatile organic compounds which may include, for example, air stripping product streams, centrifugal purge/inerting systems, degreasing of metal parts, dry cleaning stores, printing and painting facilities, propellant manufacturing operations, soil decontamination facilities, ventilation systems and gasoline transfer terminals. The gas stream may be, for example, air, $N_2$, $O_2$, $CO_2$, methane, argon, hydrogen and helium. Those skilled in the art will recognize the above list of examples is not exhaustive. The feed gas may be a multicomponent gas/vapor mixture which may be a mixture of gases and vapors, or only vapors.

The term "porous membrane" or "microporous membrane" refers to a hydrophobic or a hydrophilic, or hydrophobic on one side and hydrophilic on the other side material containing pores having a diameter between 1 µm to about 10 µm. Preferably, the membrane is provided in the form of a hollow fiber.

The term "ultrathin" when referring to the thickness of a highly solute-permeable plasma polymerized nonporous silicone skin on the outside surface of the porous membrane means approximately 0.1 µm to 10 µm; preferably about 1 µm. This ultrathin nonporous skin is a significant barrier to permeation for such gases as air, nitrogen, carbon dioxide, etc. The skin developed by plasma polymerization on the microporous substrate develops an integral bonding with the substrate. Examples of ultrathin nonporous skin include rubber-like materials such as dimethylsilicone, copolymers of silicone-polycarbonate, poly (1-trimethyl silyl-1-propyne), fluoroelastomers, polyurethane, and polyvinylchloride, to mention a few.

The term "hydrophobic" describes a substance which does not absorb or adsorb water. Preferred hydrophobic membranes include porous polyethylene, porous polypropylene, porous polyamides, porous polyimides, porous polyetherketones, porous polyvinylidene fluoride, porous polyvinylchloride, porous polysulfone, porous polyethersulfone, and porous polytetrafluoroethylene (PTFE). In a specific embodiment, the hydrophobic membrane is a porous propylene membrane, CELGARD (Hoechst Celanese, SPD, Charlotte, N.C.). These membranes may be isotropic (like CELGARD), or they may be asymmetric, as in ultrafiltration membranes. In an embodiment of the invention, the hydrophobic membranes may be CELGARD X-10 and CELGARD X-20. Those skilled in the art will recognize that the above list of examples is not exhaustive.

The term "hydrophilic" describes a substance that readily associates with water. Preferred hydrophilic membranes include porous regenerated cellulose, porous cellulose acetate, porous cellulose acetate-nitrate, porous cellulose triacetate, microporous glass, porous porcelain, and polyacrylonitrile, to mention a few.

Those skilled in the art will recognize that the above list of examples is not exhaustive.

As used herein, the term "solute" refers to, for example, volatile organic compounds. Specific examples of volatile organic compounds include toluene, xylene, acetone, trichloroethylene, trichloroethane, methanol, ethanol, methyl ethyl ketone, carbon tetrachloride, vinyl chloride, isobutanol, chlorobenzene, butane, pentane, hexane, octane, fluorinated hydrocarbons (CFC-11, CFC-12, CFC-113, CFC-114, CFC-115, etc.), HCFC ($C_2HCl_2F_3$), perchloroethylene, to mention but a few. Those skilled in the art will recognize the above list of examples is not exhaustive.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may also be seen on other views.

Experiments with a preferred embodiment of the present invention as described below have clearly shown that, when separating VOCs from air/$N_2$, introducing the feed gas flow on the non-skin, fiber bore side (i.e., through the inside lumen of the fibers viz. the tube side) is distinctly superior to introducing the feed gas flow on the membrane skin side, i.e., the shell side, when the porous membrane is used in conjunction with a nonporous membrane as disclosed in the present invention.

DESCRIPTION OF THE PREFERRED EMBODIMENT

A preferred embodiment of the present invention utilizes a method and apparatus for VOC permeation-separation from $N_2$/air using a hollow fiber membrane which has many desirable features. Referring to FIG. 1, an apparatus 10 preferably incorporates a hollow fiber membrane module 12 having a shell side 14 and a tube side 16. FIG. 2 also shows the shell-and-tube configuration of the hollow fiber membrane module 12.

As seen in FIGS. 1-4, VOC-laden air/$N_2$ 18 flows at approximately one atmosphere through the bores 20 of hollow fibers 22. The microporous hollow fibers 22 are made of polypropylene and have an ultrathin plasma polymerized nonporous silicone skin 24 on the outside surface 26. Pulling a vacuum on the device shell side 14 removes a highly VOC-enriched permeate 28.

Referring to FIGS. 1-4, it is seen that since the VOC-air mixture 18 flows through the hollow fiber bore or lumen 20, the porous substrate 29 is filled with feed air (or nitrogen or other mixture of gases and vapors) at one atmosphere. Virtually all of the pressure drop occurs across the silicone coating 24, there being virtually no pressure drop in the permeate 28 on the relatively open shell side 14 of the device. The separation efficiency, therefore, is likely to be considerably higher than that in a configuration where feed VOC-air mixture 18 flows on the shell side 14 and vacuum is pulled through the tube side 16 as disclosed in the prior art. The vacuum is preferably induced by a vacuum pump 30.

Although not intending to be bound by any particular theory or mechanistic explanation, the results adduced in the instant examples suggest that in this latter (prior art) configuration, build-up of permeate in the pores may unexpectedly create a local area of relatively high pressure, thus reducing the pressure gradient across the membrane and decreasing the efficiency of permeation.

The preferred embodiment contemplates additional features of considerable interest. In the preferred embodiment illustrated in FIG. 4, the diameters "d" of the pores in the porous support 29 at the location 32 where the support pore 33 has been closed by silicone rubber or the like 24 during plasma polymerization are progressively smaller until reaching the nonporous membrane. At high feed VOC concentrations, the conical pore shape is expected to favor pore condensation of the VOC at such locations 32. In the absence of pore condensation due to low VOC partial pressure, there will be preferential VOC adsorption on the pore surfaces 34, which will hinder $N_2$ (or air, etc.) flux but facilitate VOC flux. Pore condensation will reduce air/$N_2$ flux and increase VOC/air or VOC/$N_2$ selectivity significantly because the condensate will be selective for the VOC, and exclusive of the air or $N_2$.

In a further preferred embodiment, the apparatus of the present invention is arranged in tandem with an apparatus for removal of VOCs from a feed gas as described in U.S. application Ser. No. 08/248,062, filed May 23, 1994, which is hereby incorporated by reference in its entirety. The tandem arrangement is shown schematically in FIG. 5. The apparatus 100 of the '062 application comprises an absorption module 110 containing a porous membrane wetted by an absorbent liquid, which thereby contacts the feed gas mixture. The pressure within the absorption module is controlled so that the interface between the gas feed mixture and the liquid absorbent is substantially immobilized at the membrane to effectively prevent the formation of a dispersion of gas feed mixture and liquid absorbent in either chamber. A regeneration module 120 (also called a stripper module 120) contains a nonporous material which divides the regeneration module into a liquid absorbent chamber and a vacuum atmosphere chamber. A vacuum outlet port communicates with the vacuum chamber. As seen in FIG. 5, the feed gas would be fed into the apparatus of the present invention for initial removal of of VOCs. The exhaust feed gas, in which VOC concentration is greatly reduced, would then be fed into the apparatus of the '062 application for further VOC removal. This arrangement provides for highly efficient reduction in VOC levels of exhaust gases without overloading the liquid absorbent.

For example, methylene chloride at 6000 ppmv in $N_2$ at 22.5° C. was introduced at 58.8 cc/min into a preferred embodiment of the vapor permeation apparatus of the present invention with an absorption module and stripper module combination as described in Application '062. The exit concentration of the methylene chloride leaving the vapor permeation apparatus of the present invention was 63 ppmv. That gas flow was introduced to the '062 apparatus, and the treated gas concentration exiting that apparatus contained only 2 ppmv methylene chloride. Paraffin absorbent (Paratherm) was circulated at 5.2 ml/min in the '062 apparatus. Although not shown with this configuration in FIG. 5, a single vacuum pump provided a vacuum means for the permeate side of both the vapor permeation system of the present invention and the '062 absorption-stripping device, although two different vacuum sources could be utilized as shown in FIG. 5. The combination of these two devices is very desirable because the '062 absorption-stripper module combination would require much larger membrane area in handling inlet concentrations of methylene chloride on the order of 6000 ppmv. Such high concentrations would have saturated the particular examples used in the '062 device. The two devices working in tandem, however, reduced the 6000 ppmv feed stream to a mere 2 ppmv, an overall removal rate which is comparable to that of activated carbon beds which are currently used in industry.

EXAMPLES

Experiments were performed by using the apparatus and method of the preferred embodiment. FIGS. 1–4 illustrate the internal elements of the hollow fiber membrane module 12. A schematic representation of the experimental setup 100 for testing the permeation of VOCs from nitrogen is shown in FIG. 6.

As seen in FIGS. 3 and 4, a novel highly VOC-selective hollow fiber membrane 22 having an ultrathin (~1 μm) plasma polymerized silicone layer 24 was used to develop a permeation-separation process and apparatus which selectively recovers VOCs from $N_2$/air streams 18. $N_2$/air containing VOCs was passed through the lumen 20 of hollow fibers 22 potted in a module 12 while a vacuum was applied to the shell side 14.

Figure 6:
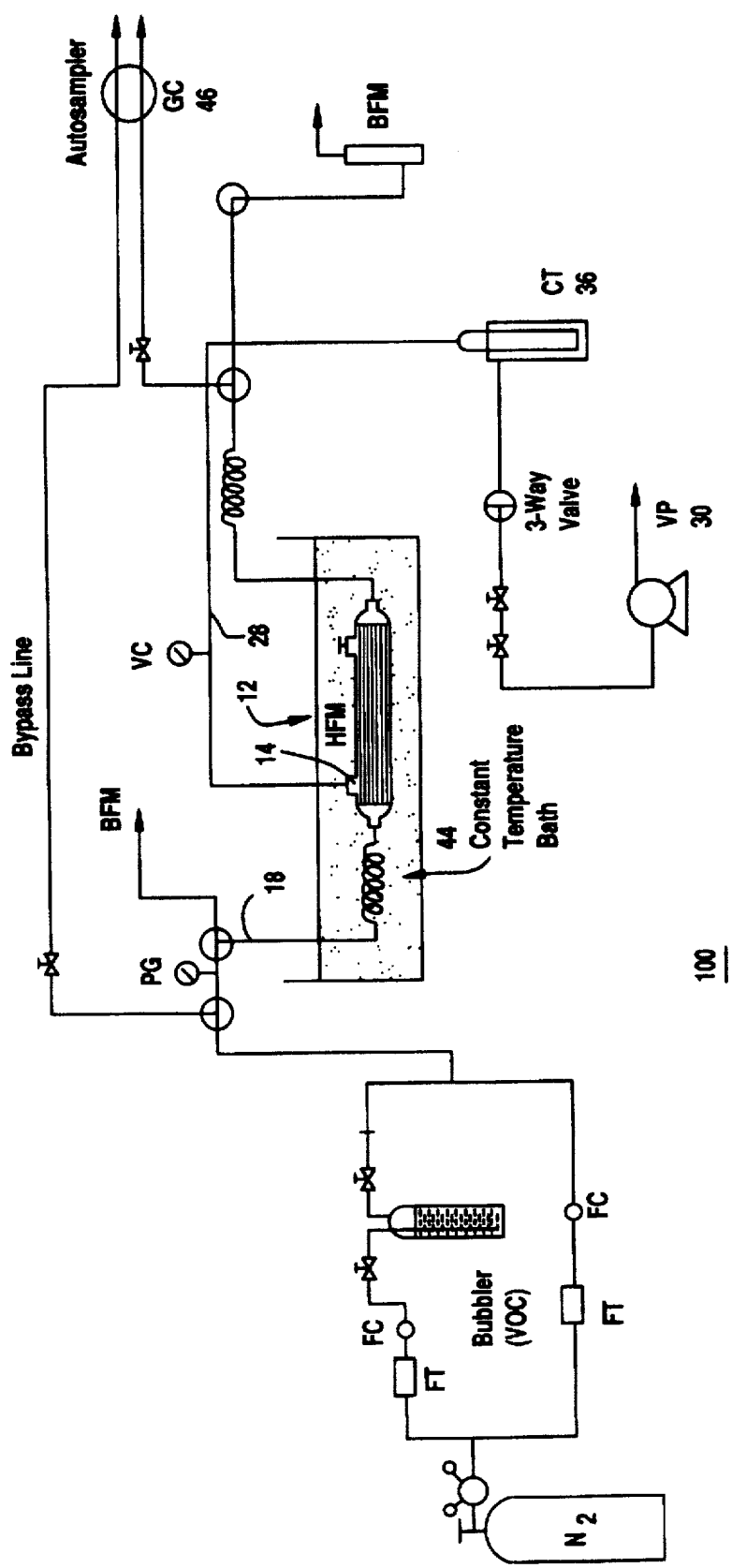
FIG. 6 is a schematic representation of the experimental setup for testing the permeation of VOCs in a preferred embodiment of the present invention.

As seen in FIGS. 1, 2, and 6, VOC-laden air/$N_2$ 18 was introduced at about one atmosphere through the bores 20 of hollow fibers 22 in a shell-and-tube heat exchanger arrangement. Referring to FIG. 4, the microporous hollow fibers 22 of polypropylene had an ultrathin plasma polymerized nonporous silicone skin 24 on the outside surface 34. As seen in FIGS. 1 and 6, a vacuum pulled on the device shell side 14 removed a highly VOC-enriched permeate 28. Because the VOC-air mixture 18 flows through the hollow fiber bore 20, the porous substrate 29 is filled with feed air at one atmosphere. Virtually all of the pressure drop is imposed on the silicone skin 24, there being a negligible pressure drop in the permeate 28 on the relatively open shell side 14 of the device 12.

During experiments, the VOCs were condensed by means of a condenser 36 and a vacuum pump 30 (as illustrated in FIG. 6). The hollow fiber permeator 12 had a very high surface area per unit volume (as much as 100 cm$^{-1}$) compared to spiral-wound devices (~7-8 cm$^{-1}$); therefore, the size of the permeator is small. The process is generally suitable for air streams exceeding 25% lower explosive limit (LEL) threshold and has no relative humidity limitation. In addition, the permeator is modular so the process may be scaled up or down easily.

Membrane modules were built to study vapor/gas permeation through the hollow fiber membrane. Analytical and numerical computer models were developed to simulate the observed separation behavior between a VOC and $N_2$. Various feed VOC concentrations were removed with a high level of purification. Many of the experiments employed $N_2$ feed at atmospheric pressure containing either toluene or methanol. Other experiments were carried out for other VOCs, e.g., acetone and methylene chloride and other experimental conditions, e.g., air instead of $N_2$, feed $N_2$ containing a VOC at higher pressures, and mixed VOC feed streams. The apparatus and experimentation are further described below.

Membrane Modules

A number of different modules were built using hollow fiber membranes. The specifications for a larger module (#2) and a smaller module (#4) are listed in Table 1. The fibers were potted at the end of the modules by a triple layer potting technique (T. H. Papadopoulos, "Further Studies on Hollow Fiber Contained Liquid Membrane Separation of Gas and Liquid Mixtures," Ph.D. Dissertation, Stevens Institute of Technology, Hoboken, N.J., 1992). As seen in FIG. 6, the VOC permeation-separation from $N_2$ feed gas was carried out at 30° C. in an experimental setup in which gas flow rates were controlled and measured by electronic digital mass flowmeter-controllers (Matheson, E. Rutherford, N.J.) and checked by a bubble flow meter. The concentrations of the VOC in $N_2$ at the permeator inlet and exit were measured in a gas chromatograph (GC) having a flame ionization detector (FID). The same procedure and apparatus were employed for experiments using an air stream instead of a $N_2$ stream. A more detailed discussion of the experimental apparatus is provided below.

The diffusive flux, $J_i$, of a species i (VOC or $N_2$) through the hollow fiber membrane at any location in the hollow fiber module is proportional to the permeability coefficient of species i, $Q_i$; since permeance of species i through a membrane of thickness $\delta_m$ is defined as $Q_i/\delta_m$, $J_i$ is also proportional to the permeance. In general, $Q_i$ for a VOC in a silicone membrane is likely to be a strong function of the VOC partial pressures on both sides of the membrane. Whenever a high vacuum is imposed on the permeate side, the effect of permeate side VOC partial pressure will be quite small. Thus $Q_i$ will depend only on $P_{iF}$, the feed side partial pressure of VOC, when permeate side is under high vacuum. In a hollow fiber module where 95-98% of the VOC is being removed at a low feed gas flow rate, $Q_i$ will vary from location to location in the module as $P_{iF}$ varies along the module. Therefore, experiments using the smaller module (#4) listed in Table 1 for high feed gas flow rates were carried out so that $P_{iF}$ changes by no more than 10% in the module. The measured $Q_i$ will then be characteristic of the inlet $P_{iF}$. By varying inlet $P_{iF}$ to different levels, $Q_i$ is obtained as a by the coating or by both. Substrate-controlled separation of permanent gas mixtures is well known and is illustrated by the PRISM process commercialized by Monsanto, for example as disclosed by J. M. S. Henis and M. K. Tripodi in "Composite Hollow Fiber Membranes for Gas Separation: The Resistance Model Approach," J. Membrane Sci., 8, 233 (1981). The substrate in these membranes had extremely low porosity of the order of $10^{-6}$ and the nonporous section of this substrate controlled the gas permeation. Pinnau et al. (1988), cited above, have studied vapor permeation with skin-side feed through composite membranes made out of a thin coating of silicone on a microporous polysulfone support having a high porosity (>0.05). They have observed that the ($C_2Cl_4$) vapor permeability through the silicone is so high that the porous substrate resistance controlled the separation unless the thickness of the silicone was increased to about 10 μm from a possible 1 μm, which translates into a considerably reduced VOC flux.

The microporous hollow fiber substrate 29 being used in the present experiments had a high porosity around 0.3. Yet from Pinnau et al. (1988), it is obvious that if feed is imposed on an ultrathin silicone coating and vacuum is applied through the substrate pores (fiber bore side), there will be considerable pressure drop in the permeate flow through the pores. This will reduce the driving force across the coating significantly, leading to poorer separation. Therefore, the

TABLE 1

| | | Specifications of the Hollow Fiber Modules | | | | | |
|---|---|---|---|---|---|---|---|
| Module No. | No. of Fibers | Effective Fiber Length (cm) | Surface Area of Module (cm²) | ID/OD of the Fibers (μm) | Thickness of the Coated Layer (μm) | Average Porosity of the Support | Average Pore Size (μm) |
| 2 | 50 | 25 | 103.8 | 240/292 | ~1 | 0.3 | 0.03 |
| 4 | 15 | 6 | 7.47 | 240/292 | ~1 | 0.3 | 0.03 | function of $P_{iF}$ for a given VOC. Such information is used in modeling hollow fiber permeator modules as an input for predicting permeation behavior.

It should be noted that if the feed gas is forced into the tube side at a high enough pressure, the resulting pressure of the permeate on the shell side may increase enough to induce permeate flow out of the system without any vacuum means.

As illustrated in FIGS. 1-4 and 6, in the experimental apparatus, the high selectivity of the hollow fiber membrane for the VOCs over $N_2$/air (in the range of 10-200 or higher) was provided by an ultrathin (~1 μm) plasma polymerized nonporous coating of silicone rubber 24 on the outside surface of a microporous hydrophobic polypropylene fiber 29. The fiber dimensions were 240 μm I.D. and 292 μm O.D. The plasma polymerized silicone coating 24 has high selectivities for VOC over $N_2$/air. Due to the ultrathin nature of the silicone coating 24, the VOC flux for a given driving force is expected to be quite high since species flux through such a membrane is inversely proportional to the thickness of the coating.

Ordinarily the flux of a species through a composite membrane consisting of a nonporous coating on a microporous substrate will be influenced by the resistances of both, as discussed in "Membrane Gas Separation," in Progress in Separation and Filtration, Vol. 4, Wakeman, R. J. (Ed.), Elsevier, London (1986) by A. Sengupta and K. K. Sirkar. Depending on the nature of the coating, its thickness, the nature of the substrate and its thickness, the species flux through the membrane may be controlled by the substrate or strategy of passing feed flow through the fiber lumen was adopted in these experiments. The VOC in the feed gas 18 then diffuses through the relatively very open porous substrate 29 until encountering the nonporous silicone coating 24 as seen in FIGS. 3 and 4. Essentially all the available vacuum is applied to the other side of the nonporous coating, i.e. the shell side. The partial pressure driving force is maximized and the achieved separation is much higher.

The substrate in the coated fibers plays other important roles as well. It provides mechanical strength due to a very good bonding to the plasma-polymerized coating of rubbery silicone, the flux through which is likely to control the separation. The substrate and the coating must both be chemically resistant to VOCs. The silicone coating and the polypropylene substrate in the fibers are quite inert.

In the experimental apparatus, the coated hollow fibers were very highly packed in the separation device. As a result, the gas purification rate/unit separator volume was very high. The gas flow rate/fiber is kept small so that percent VOC removal was very high. The low flow rate implies that the gas pressure drop in short modules is very small; simple blowers may be used to push $N_2$/air through the fiber bore when the feed is at atmospheric pressure. By letting the feed gas flow through the fiber bore, any bypassing on the shell side was avoided.

Referring to FIG. 4, the coated hollow fibers 22 used were obtained from Applied Membrane Technology Inc. (Minnetonka, Minn.). These fibers 22 are thin film composite membranes. An ultrathin layer of silicone rubber 24 was coated onto the outside surface 26 of a porous polypropylene hollow fiber 22 via plasma polymerization process. Due to the plasma polymerization process, the bonding or binding force between the silicone rubber and polypropylene was very strong. The porous substrate 29 used was Celgard X-10 (Hoechst Celanese, Charlotte, N.C.). The porosity of the substrate was relatively high at 30% and the pore size was 0.03 µm. A number of hollow-fiber modules (HFM) 12 were prepared using such coated fibers. Details of two modules are provided in Table 1.

A schematic of a hollow-fiber module 12 which resembles a shell-and-tube heat exchanger is shown in FIG. 2. The shell consisted of a ¼" (0.62 cm) stainless steel tube with a ¼" (0.62 cm) male run tee at both ends. Three layers of potting were prepared at each end where the male run tee was connected. The first layer which was applied from the outside end where the fibers were jutting out from the tee end employed a translucent silicone sealant (RTV 118, G.E. Silicones, General Electric Co., Waterford, N.Y.). After the silicone sealant was cured for one day, a two-component silicone rubber, RTV 615 (GE Silicones, General Electric Co., Waterford, N.Y.) was applied through an opening on the shell side as the second layer. The second layer of silicone rubber was cured for three days; then epoxy was applied as the third layer again through the shell side opening. The epoxy selected was a two-component system of Armstrong C-4 epoxy with "D" activator (Beacon Chemicals, Mt. Vernon, N.Y.) mixed in an epoxy/activator ratio of 4/1. The details of the potting process were described by Papadopoulos (1992). The full cure strength of the epoxy was achieved at the end of a week. After potting, the module was tested for leakage. Distilled water was filled into the shell side of the module and was pressurized to 20 psig (240 KPa) to ensure that no water leaked from the lumen of the fibers or from the potting. If no leak was observed, dry nitrogen was passed through the tube and shell side of the module to remove the water completely.

The overall experimental setup is shown schematically in FIG. 6. A nitrogen stream from a cylinder was introduced to a stainless steel bubbler filled with the liquid VOC. To enhance the contact of nitrogen with the VOC, an air diffuser was used to make fine nitrogen bubbles in the VOC bubbler. This stream was later mixed with a second stream of pure nitrogen to produce a stream of desired VOC concentration and flow rate. The flow rates of the two streams were monitored by a Matheson digital readout and control module (Model 8249). The same module was used to set and control the flow rates. The VOC/$N_2$ stream was then split into two streams. One stream which had a small flow rate (~1 cc/min) was directed to a gas chromatograph (GC) to measure the concentration of the VOC. The other stream was introduced to the tube side of the HFM as vacuum was applied countercurrently in the module shell side. The outlet stream 28 from the HFM was also split into two streams. The smaller stream, whose flow rate was carefully controlled to be about 1 cc/min, was sent to the GC to measure the VOC concentration. The other stream was vented to the laboratory hood. A vacuum pump 30 (Model 1410, Welch Scientific Inc., Skokie, Ill.) was used to pull vacuum in the shell side. A cold trap 36 was connected between the vacuum pump 30 and the HFM 12. A mixture of dry ice and acetone was used in the cold trap to condense the VOC in the permeated gas stream.

The membrane module was immersed in a water bath. The temperature of the bath was maintained at 30° C. by a constant temperature immersion circulator (Hakke, Germany).

The concentration of VOC in the gas stream was measured in a GC (Hewlett Packard Model 5890A) via a flame ionization detector (FID). The two streams from the inlet and the outlet of the HFM were connected to a 10-port automatic gas sample valve (HP 18900F) which had two 0.25 cc sampling loops. The inlet and outlet streams were connected to loops 1 and 2, respectively. There were two injections in each run; injection of sample loop 2 was implemented 2 minutes after the injection of loop 1. The column used was a stainless steel Carbograph column (length: 8 feet, mesh size: 60/80, Alltech, Deerfield, Ill.). The temperature of the injector, oven, and detector were set at 200°, 230°, and 250° C., respectively. The retention times of methanol, toluene, acetone and methylene chloride were 0.89, 13, 1.34 and 1.38 minutes respectively.

Types of Experiments

Two types of experiments were carried out: (1) to determine the VOC permeance, $(Q_i/\delta_m)$, feed gas was introduced at a high flow rate into a small module (#4) so that gas composition changed by a limited amount; and (2) to explore the extent of VOC removal by the silicone coated hollow fibers in the module (#2) by carrying out experiments at various feed gas flow rates and feed VOC concentrations.

Permeance of VOC as a Function of Concentration

The permeability of a VOC through silicone rubber is strongly dependent on the partial pressure of the VOC in the gas stream, as discussed by Baker, et al. in "Separation of Organic Vapors from Air", J. Membrane Sci., 31, 259 (1987). To predict the VOC removal performance of silicone coated HFM, it is necessary to know the permeance $(Q_i/\delta_m)$ of the VOC in the silicone membrane at a constant partial pressure of VOC. It is difficult to maintain a constant partial pressure of VOC vapor in a HFM. Experiments were therefore carried out such that the VOC partial pressure changed by a limited amount (less than 10%) between the inlet and the outlet streams of the module. Therefore, the partial pressure of VOC throughout the length of the module was maintained in a small range. These experiments were carried out in module #4 which has a much smaller active area. Many experiments with inlet toluene concentrations varying between 650–12500 ppmv were carried out to determine the relation between $(Q_i/\delta_m)$ and the partial pressure of toluene. Increasing the feed gas flow rate was used to achieve small changes in the toluene partial pressure along the module. Similar experiments were carried out for methanol over a wider range of concentrations, up to 35,000 ppmv.

VOC Removal in the Hollow Fiber Module

The performance of the HFM was studied using different feed flow rates and inlet VOC concentrations. Module #2, which had the parameters as described in Table 1, was used. High, or full, vacuum (1 torr; 0.1 cm Hg) was used in the shell side while $N_2$/air containing VOC was passed through the tube side of the HFM. The flow rate of the gas stream was varied between 10 and 600 cc/min. For each flow rate, different feed VOC concentrations were used. The feed concentrations used ranged in volume % from 0.04 to 7.51% for methanol, 0.2 to 1.235% for toluene, 0.1 to 0.6% for methylene chloride and 0.8 to 2.2% for acetone. The mathematical model described in the next section will be used to model some of these results using $(Q_i/\delta_m)$ as a function of the VOC partial pressure for the VOC toluene. By way of comparison, for some experiments with toluene and methanol, feed gas containing the VOC at atmospheric pressure was passed through the shell side and the permeate was withdrawn through the tube side by means of a vacuum pump.

Modeling

Two models were developed to predict the VOC separation behavior in long hollow fiber modules. First, an analytical solution of the permeation equations was developed based on the twin assumptions of negligible $N_2$ loss through the membranes and high permeate-side vacuum. Second, a detailed numerical solution of the governing partial differential equations was carried out to describe the observed VOC-removal behavior. The analytical solution was compared with the full numerical solution of the governing equations as well as the observed VOC separation data. Descriptions and values of parameters used in the modeling of the performance of module #2 are listed in Table 2.

2. $Q_a/\delta_m$ depends only on Px.
3. Pressure P is essentially constant on the feed side.
4. $Q_a/\delta_m$ depends on Px in the manner of $$Q_a/\delta_m = a \exp(b\ Px) \tag{1b}$$

5. Change of L with l, the length coordinate of the permeator, is negligible.

These assumptions allow us to simplify eqn. (1a) to $$L \frac{dx}{dl} \cong \pi D_{lm}(Q_a/\delta_m)Px = \pi D_{lm}aP[x \exp (b\ Px)] \tag{1c}$$

$$\frac{\pi D_{lm}aP}{L} \int_0^{l_f} dl = \int_{x_w}^{x_f} \frac{dx}{x \exp (bPx)} \tag{1d}$$

TABLE 2

Description and Values of Parameters used in Simulation of VOC Permeation with Coated Fiber Module

| Item No. | Description of the Parameter, unit | Value |
| --- | --- | --- |
| 1 | Silicone Fiber Module 2 | |
| 2 | Feed: $N_2$/toluene or MeOH/$N_2$ | |
| 3 | Length of the fiber, cm | 25.0 |
| 4 | Experimental temperature, °C. | 30.0 |
| 5* | a, constant of Q(voc) = a* exp(b* Pvoc), gmol/cm² cm Hg s) | 185.6E-10 (toluene) |
| | | 267.70E-10 (MeOH) |
| 6* | b, second constant of above equation; 1/atm | 78.81 (toluene) |
| | | 27.52 (MeOH) |
| 7** | a($N_2$), constant of Q($N_2$) = a($N_2$)*exp{b($N_2$) *Pvoc}, gmol/(cm² cm Hg s) | 3.803E-10 |
| 8 | b($N_2$), second constant of above equation; 1/atm | 0.0 |
| 9 | ID of the fiber, cm | 240.0E-04 |
| 10 | OD of the fiber, cm | 292.0E-04 |
| 11 | Pressure of tne feed inlet, cm Hg | (Exptl. value) |
| 12 | Pressure on the vacuum side, cm Hg | 0.1 |
| 13 | Viscosity of $N_2$ at 30° C., poise (g/cm s) | 1800.0E-07 |
| 14 | Flow rate of the feed gas, cc/min | (Exptl. value) |
| 15 | No. of fibers | 50 |
| 16 | Mole fraction of VOC at the feed inlet | (Exptl. value) |

*Constants a and b for respective VOCs were obtained by fitting their permeance data.
**Constant a($N_2$) was obtained by fitting its permeance data derived from flux data; constant b was assumed to be 0 for convenience.

Analytical Model

Figure 7:
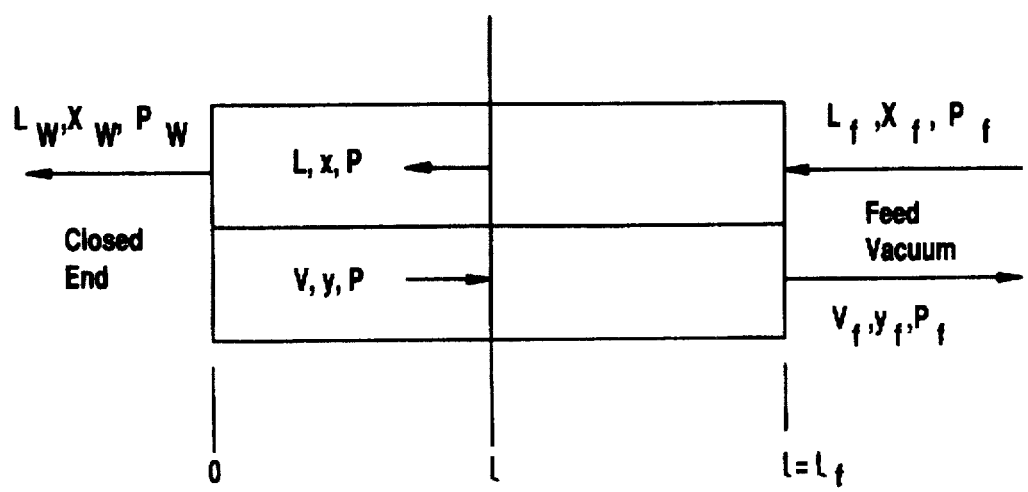
FIG. 7 is a schematic of a hollow fiber permeator showing variables used in modeling.

The schematic diagram of a membrane permeator for VOC removal from a VOC/$N_2$ feed and the permeate stream in countercurrent flow is shown in FIG. 7. The residue end coordinate is l=0. At steady state, the differential equation governing the VOC permeation is given by $$\frac{d(Lx)}{dl} = \pi D_{lm} \left( \frac{Q_a(Px, py)}{\delta_m} \right) (Px - py) \tag{1a}$$

where $Q_a$ is the VOC permeability, L is the gas flow rate per fiber, x is the feed side VOC mole fraction, P is the feed side total gas pressure, p is the permeate side total gas pressure and y is the permeate side VOC mole fraction for a silicone membrane of thickness $\delta_m$ on the fiber outside diameter $D_o$ and $D_{lm}$ is the logarithmic mean diameter of the fiber. For an exact analysis of permeation, many other equations are needed; they will be considered later in connection with the complete numerical solution. We first consider an approximate approach leading to an analytical solution to determine the extent of VOC removal in a hollow fiber permeator.

Analytical Solution

Assume:
1. py << Px corresponding to high vacuum on the permeate side.

-continued $$\left( \frac{\pi D_{lm}aP}{L} \right) l_f = \left[ \ln x - \frac{(bPx)}{1 \cdot 1!} + \frac{(bPx)^2}{2 \cdot 2!} - \ldots \right]_{x_w}^{x_f} \tag{1e}$$

Since $D_{lm}$, a, b, P, L, $l_f$ and $x_f$ are known, one can easily obtain $x_w$ from eqn. (1e) and compare it with the experimentally observed $x_w$. One can also develop additional analytical solutions corresponding to different forms of the VOC permeance relation (1b) for example, $$Q_a/\delta_m = a + (bPx)^2 \tag{2a}$$

Further, one can also incorporate the small variation of L along the permeator length due to $N_2$ permeation. For example, if we assume that the change in L along the length is essentially due to $N_2$ permeation, we can incorporate nitrogen permeability $Q_b$ and write $$\frac{d(L(1-x))}{dl} \cong \frac{dL}{dl} = \tag{2b}$$

$$\pi D_{lm} \frac{Q_b}{\delta_m} \{P(1-x) - p(1-y)\} \cong \pi D_{lm} \frac{Q_b}{\delta_m} P$$

-continued $$\text{Therefore } \int_L^{L_f} dL \cong \int_l^{l_f} \pi D_{lm} \left( \frac{Q_b}{\delta_m} \right) P \, dl \quad (2c)$$

If we assume that $(Q_b/\delta_m)$ is essentially independent of VOC mole fraction x and therefore the length coordinate l, we obtain $$L = L_f - \pi D_o \left( \frac{Q_b}{\delta_m} \right) P(l_f - l). \quad (2d)$$

We can now reformulate eqn. (1d) as $$\pi D_{lm} aP \int_o^{l_f} \frac{dl}{L_f - \pi D_{lm} \left( \frac{Q_b}{\delta_m} \right) P(l_f - l)} = \int_{x_w}^{x_f} \frac{dx}{x \exp(bPx)} \quad (2e)$$

Integration leads to $$\frac{a}{(Q_b/\delta_m)} \ln \left[ 1 - \frac{l_f}{L_f - (L_f/(\pi D_{lm} P(Q_b/\delta_m)))} \right] = \left[ \ln x - \frac{(bPx)}{1 \cdot 1!} + \frac{(bPx)^2}{2 \cdot 2!} - \right]_{x_w}^{x_f} \quad (2f)$$

an equation similar to eqn. (1e) that may be solved easily by trial and error.

Numerical Solution

To develop an exact numerical solution of the VOC permeation problem, the following assumptions were employed.

1. The permeability coefficient of a VOC through the silicone coating depends on the VOC partial pressures on two sides of the silicone coating.
2. Axial diffusion is insignificant compared to bulk gas convection.
3. The pressure in the permeate side is constant along the module.
4. There is no mass-transfer resistance in the bulk gas phases.
5. Hagen-Poiseuille law governs the pressure drop through the fiber lumen.
6. The end effects inside the permeator are negligible.
7. The deformation of the hollow fiber under external pressure is negligible.

A schematic diagram where a VOC/$N_2$ feed and the permeate stream flow countercurrently is shown in FIG. 7. An overall material balance between the feed inlet end and any location at a distance l from the closed end of the permeate side leads to $$L - V = L_f - V_f \quad (3a)$$

The mass balances for VOC and $N_2$ can be written as $$VOC: Lx - Vy = L_f x_f - V_f y_f \quad (3b)$$

$$N_2: L(1-x) - V(1-y) = L_f(1-x_f) - V_f(1-y_f) \quad (3c)$$

If the axial coordinate l is positive in the direction of permeate gas flow, the governing differential equations for permeation of two species are:

$$VOC: \frac{d(Lx)}{dl} = \pi D_{lm} \left( \frac{Q_a(Px, py)}{\delta_m} \right)(Px - py) = \frac{d(Vy)}{dl} \quad (4)$$

$$N_2: \frac{d[L(1-x)]}{dl} = \pi D_{lm} \left( \frac{Q_b(Px, py)}{\delta_m} \right)[P(1-x) - p(1-y)] = \frac{d[V(1-y)]}{dl} \quad (5)$$

Note that the permeability coefficients of VOC and $N_2$, $Q_a$ and $Q_b$, respectively are functions of partial pressures of VOC in both feed ($Px=P_{iF}$) and permeate ($py=P_{ip}$) streams. The equation governing the pressure drop in the bore of the fiber is $$\frac{dP}{dl} = \frac{128 RTL \mu_F}{\pi P D_i^4} \quad (6)$$

Rearranging the above equations and writing them in dimensionless form, one can get $$\frac{dL^*}{dS} = \alpha_a(\gamma_1 x - \gamma_2 y) + \alpha_b[\gamma_1(1-x) - \gamma_2(1-y)] \quad (7)$$

$$\frac{dV^*}{dS} = \alpha_a(\gamma_1 x - \gamma_2 y) + \alpha_b[\gamma_1(1-x) - \gamma_2(1-y)] \quad (8)$$

$$\frac{dx}{dS} = [\alpha_a(1-x)(\gamma_1 x - \gamma_2 y) - \alpha_b x(\gamma_1(1-x) - \gamma_2(1-y))]/L^* \quad (9)$$

$$\frac{dy}{dS} = [\alpha_a(1-y)(\gamma_1 x - \gamma_2 y) - \alpha_b y(\gamma_1(1-x) - \gamma_2(1-y))]/V^* \quad (10)$$

$$\frac{d\gamma_1}{dS} = \beta \mu_F^* L^* / \gamma_1 \quad (11)$$

where $L^* = L/L_{ref}$; $V^* = V/L_{ref}$; $\alpha_a = Q_a/Q_{ref}$; $\alpha_b = Q_b/Q_{ref}$ $\gamma_1 = P/P_{ref}$; $\gamma_2 = p/P_{ref}$; $\mu_F^* = \mu_F/\mu_{ref}$; $S = \pi D_{lm}(Q_{ref}/\delta_m)(P_{ref}/L_{ref})l$ $$\beta = 128 RTL_{ref}^2 \mu_{ref}/[\pi^2 D_{lm}(Q_{ref}/\delta_m) P_{ref}^3 D_i^4] \quad (12)$$

Note that $(Q_a/Q_b)$ is the VOC-$N_2$ separation factor.

Generally, it is convenient to specify the domain of the independent variable between 0 and 1. In this case the total dimensionless area (for $l=l_f$) can be made equal to unity with proper choice of reference parameters (i.e., $Q_{ref}$, $P_{ref}$ and, $L_{ref}$) in definition (12), as discussed by S. Majumdar in "A New Liquid Membrane Technique for Gas Separation", Ph.D. Dissertation, Stevens Institute of Technology, Hoboken, N.J., (1986). Equations (7)–(11) have to be solved simultaneously using the boundary conditions at $l=0$, $y=y_w$; $V^*=V_w^*$ at $l=l_f$ $L^*=L_f^*$; $x=x_f$; $\gamma_1=\gamma_{1f}$ (13)

$V_w^*$ is zero when vacuum is applied to the permeate side in countercurrent flow. The permeate VOC mole fraction, $y_w$, can not be specified explicitly in the vacuum mode; it has to be determined from eqns. (4) and (5) by using the boundary conditions at $l=0$; $y_w$ in the vacuum mode is shown to be:

$$y_w = \frac{A - (A^2 - B)^{1/2}}{C} \quad (14)$$

where $A = \alpha_{b\gamma1w} + (\alpha_a - \alpha_b)(\gamma_{1w} + \gamma_{2w})$; $B = 4\alpha_{a\gamma1w\gamma2w} X_w(\alpha_a - \alpha_b)$; $C = 2_{\gamma2w}(\alpha_a - \alpha_b)$ as found in "Gas Separation Modes in a Hollow Fiber Contained Liquid Membrane Permeator", Ind. Eng. Chem. Res., 31, 593 (1992) by A.K. Guha et al. Equation (10) is also indeterminate at l=0 when vacuum is applied to the permeate side. By applying the L'Hospital rule, this equation is changed to $$\left.\frac{dy}{dS}\right|_{S=0} = \frac{D}{E} \quad (15)$$

where D and E are $$D = \frac{d\alpha_a}{dS}(1-y)(\gamma_1 x - \gamma_2 y) + \alpha_a(1-y)\left(\frac{d\gamma_1}{dS}x + \frac{dx}{dS}\gamma_1\right) - \quad (16a)$$

$$\frac{d\alpha_b}{dS} y[\gamma_1(1-x) - \gamma_2(1-y)] - \alpha_b y\left[\frac{d\gamma_1}{dS}(1-x) - \gamma_1\frac{dx}{dS}\right]$$

$$E = \frac{dV^*}{dS} + \quad (16b)$$

$$\alpha_a(\gamma_1 x - \gamma_2 y) + \alpha_a \gamma_2(1-y) + \alpha_b[\gamma_1(1-x) - \gamma_2(1-y)] + \alpha_b y\gamma_2$$

Note that $$\frac{d\alpha_a}{dS} = \frac{dx}{dS}\frac{d\alpha_a}{dx} + \frac{d\gamma_1}{dS}\frac{d\alpha_a}{d\gamma_1} + \frac{dy}{dS}\frac{d\alpha_a}{dy} \quad (17a)$$

$$\frac{d\alpha_b}{dS} = \frac{dx}{dS}\frac{d\alpha_b}{dx} + \frac{d\gamma_1}{dS}\frac{d\alpha_b}{d\gamma_1} + \frac{dy}{dS}\frac{d\alpha_b}{dy} \quad (17b)$$

The IMSL subroutine BVPFD was used to solve numerically the set of nonlinear ordinary differential eqns. (7), (8), (9), (10), and (11) using the boundary conditions (13), (14), and (15). Initial estimate for each dependent variable at the selected grid point was generated by solving the system of differential equations as an initial value problem, assuming concurrent flow. The initial value problem was solved by the IMSL subroutine IVPRK, as discussed by S. Majumdar (1986) cited above and by A. K. Guha in "Studies on Different Gas Separation Modes with Hollow Fiber Contained Liquid Membrane", Ph.D. Dissertation, Stevens Institute of Technology, Hoboken, N.J., (1989).

Experimental Results

Single VOC separation runs were carried out in module #2 using VOC in $N_2$ as feed through hollow-fiber bores while a vacuum of 1 torr was applied to the shell side with countercurrent permeate flow. Extensive studies have been made using the VOCs, toluene and methanol. Fewer runs were made with two other VOCs, acetone and methylene chloride. The temperature of the feed gas was 30° C. and the pressure was close to one atmosphere. Several runs were made with the feed gas flowing on the shell side. Other experimental runs included using hexane and replacing $N_2$ by air.

EXAMPLE 1

Toluene Removal

The first single VOC-$N_2$ runs were made with toluene. The feed gas flow rates for toluene separation experiments were around 30, 60, 100, 150, 300 and 600 cc/min. Feed toluene concentration ranged between 2,250 and 12,500 ppmv for each feed flow rate. Some of the experimental results for toluene separation runs for tube side are tabulated in Table 3. The percent removal of toluene and feed outlet toluene concentration for tube side feed are plotted against feed toluene concentration in FIGS. 8 and 9, respectively.

TABLE 3.

Experimental Results for Toluene Separation from $N_2$ in Module 2 with Tube side Feed and Vacuum in the Shell Side

| Inlet Gas Flow Rate (cc/min) | Inlet Toluene Concentration (ppmv) | Outlet Gas Flow Rate (cc/min) | Outlet Toluene Concentration (ppmv) | Percent Removal of Toluene |
|---|---|---|---|---|
| 27.2 | 6310 | 22.4 | 103 | 99 |
| 27.0 | 9913 | 22.1 | 95 | 99 |
| 26.7 | 14102 | 21.7 | 185 | 99 |
| 58.7 | 4435 | 53.0 | 111 | 97 |
| 60.0 | 8664 | 54.3 | 171 | 98 |
| 60.4 | 12350 | 54.7 | 270 | 98 |
| 100.8 | 3615 | 94.7 | 350 | 91 |
| 99.9 | 5531 | 93.9 | 465 | 92 |
| 100.1 | 8236 | 94.0 | 646 | 92 |
| 101.1 | 10436 | 93.9 | 886 | 92 |
| 148.3 | 6080 | 143.9 | 1160 | 82 |
| 148.0 | 13800 | 142.9 | 2520 | 82 |
| 304.7 | 4020 | 296.5 | 1610 | 61 |
| 281.0 | 13990 | 272.7 | 4240 | 71 |

Figure 8:
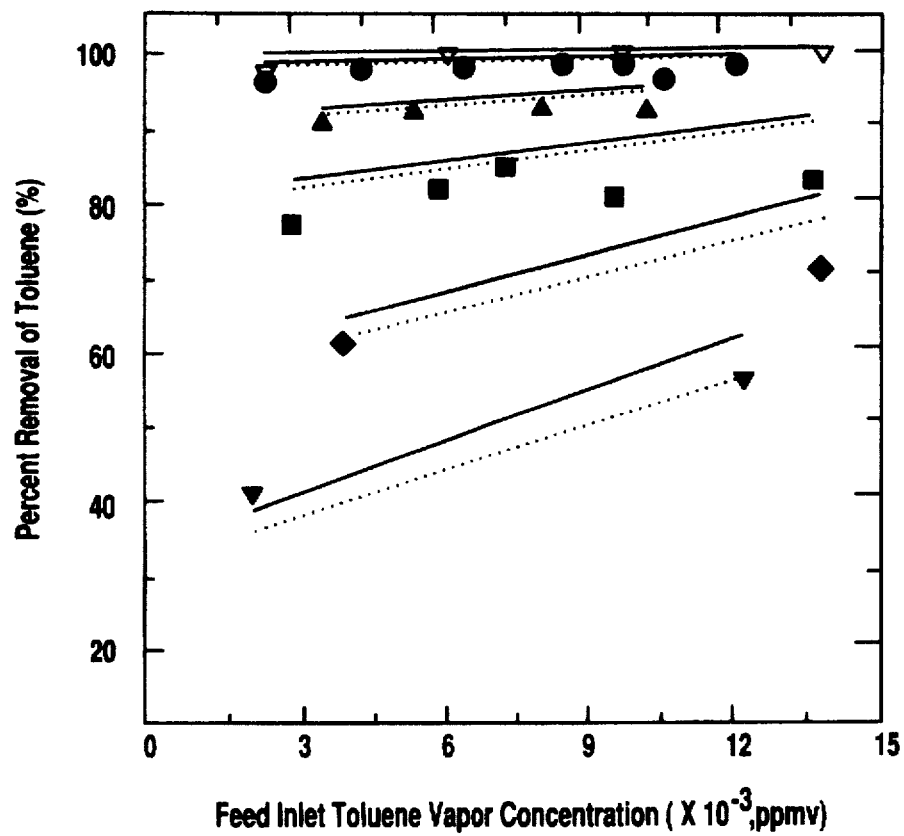
FIG. 8 shows a variation of percent removal of toluene with toluene/$N_2$ feed.
Figure 9:
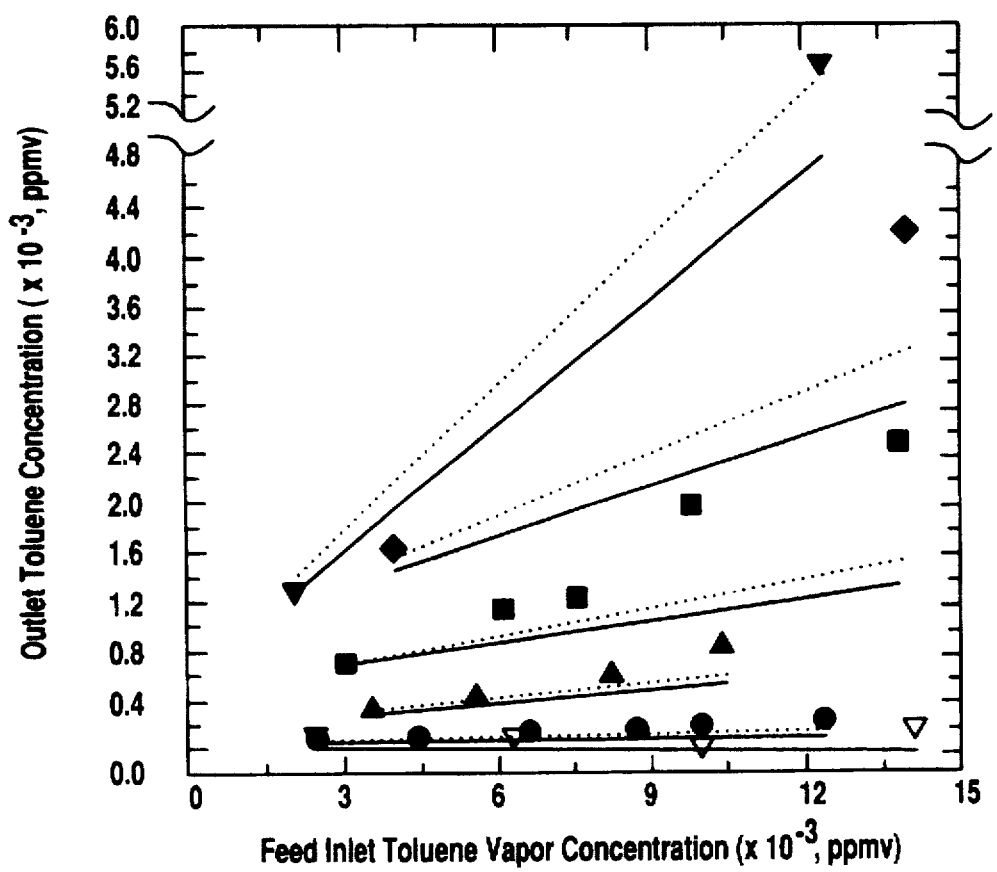
FIG. 9 shows a variation of outlet toluene concentration with feed inlet toluene vapor concentration for toluene/$N_2$ feed through the tube side.

FIG. 8 shows that, for feed flow rates below 60 cc/min, 96–99%+ removal of toluene was obtained for the whole feed concentration range; this corresponds to 1.2 cc/min/fiber feed gas flow rate for a fiber length of 25 cm. For feed toluene concentration above 5,000 ppmv at a flow rate of 30 cc/min, 98%+ removal of toluene was achieved. The feed outlet concentrations as shown in FIG. 9 were reduced to below 200 ppmv for the whole concentration range as long as the flow rate was less than 60 cc/min. The percent removal of toluene was reduced at higher gas flow rates; however, the percent removal was still considerable. For example, around 80% of toluene in the feed stream was removed at 150 cc/min.

Moreover, contrary to expectations, the percent VOC removal at a given feed flow rate increased with feed inlet VOC concentration. In other words, toluene permeance increases rapidly with concentration.

Figure 10:
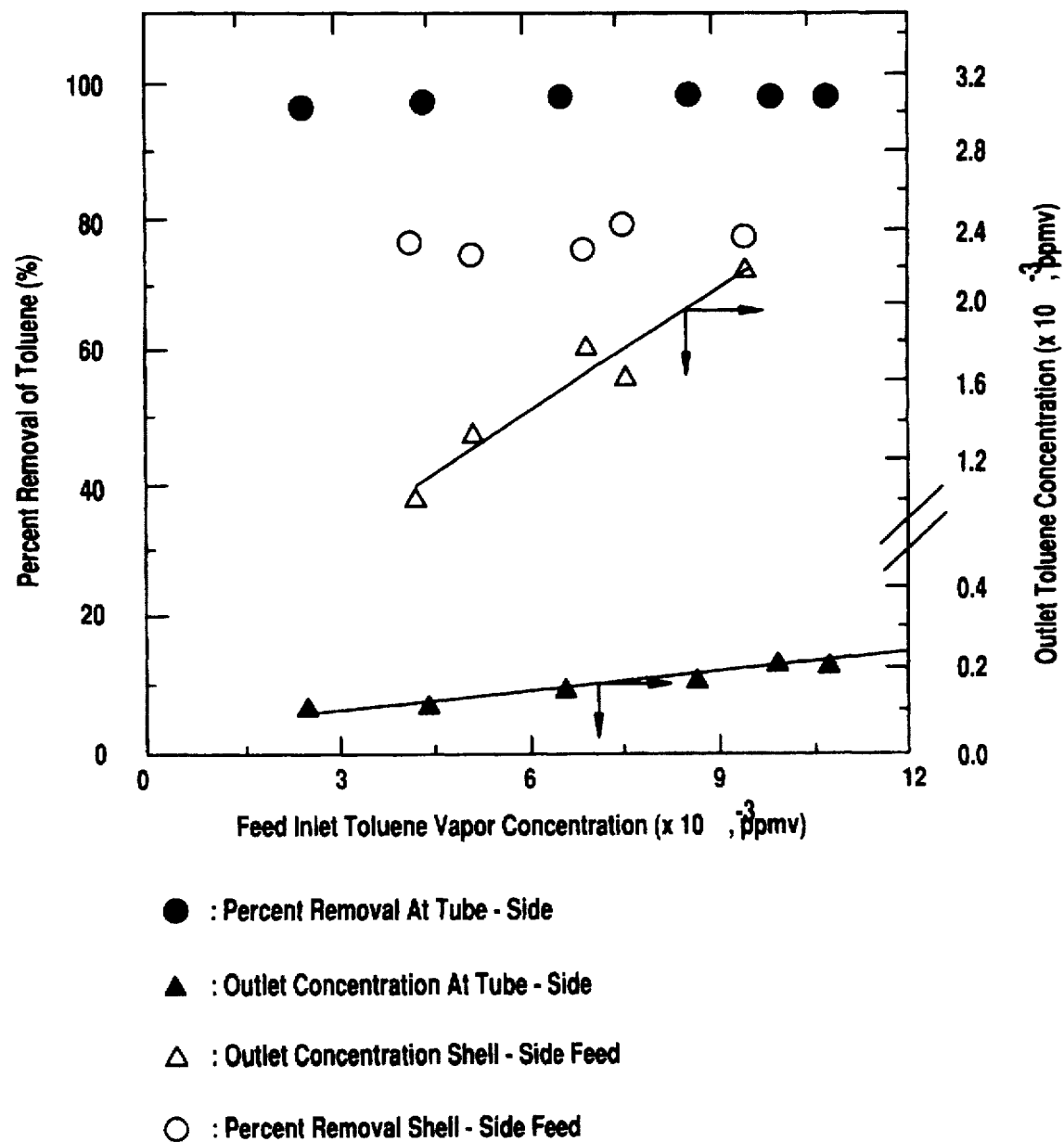
FIG. 10 shows a variation of percent removal and outlet concentration of toluene with inlet vapor concentration for toluene/$N_2$ feed of 60 cc/min through tube side and shell side.
Figure 11:
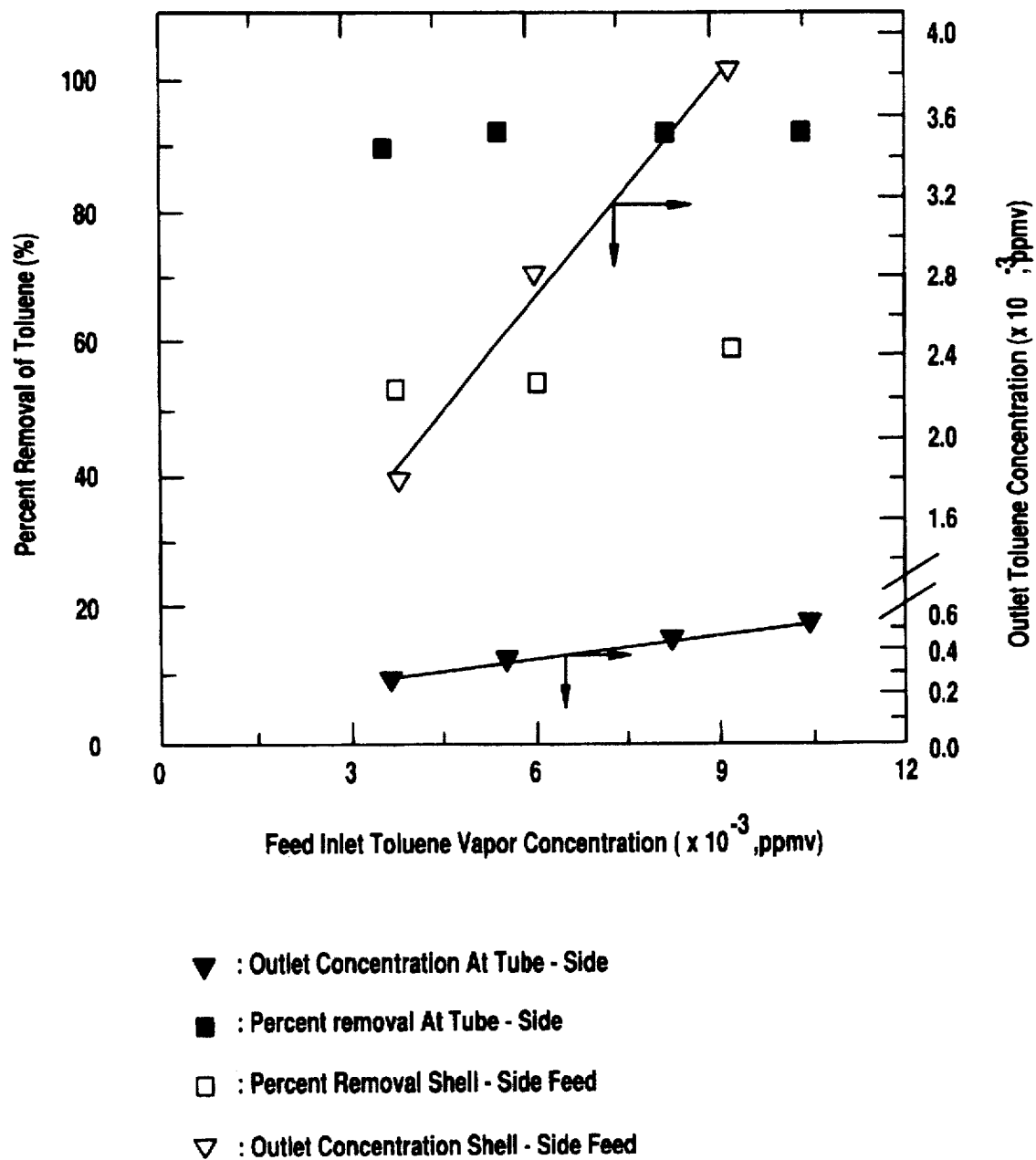
FIG. 11 shows a variation of percent removal and outlet concentration of toluene with inlet vapor concentration with $N_2$/toluene feed of 100 cc/min through tube side and shell side.

The results for shell side feed for two different feed gas flow rates are compared in FIGS. 10 and 11 with those for tube side feed in terms of percent removal of toluene and the feed outlet toluene concentration. Except for the gas fed, all other variables were the same for both orientations. Some of these shell side results are also tabulated in Table 4. One notices that the percent toluene removal is considerably lower in the shell side feed mode compared to the tube side feed mode for both gas flow rates. These data demonstrate the dramatic superiority of the tube side feed since all other conditions were maintained same. Thus, for tube side feed, toluene removal approached 100%, with slightly higher efficiency at high inlet concentration, whereas for shell side feed, toluene removal never exceeded 80%, and no trend toward an increase was discernible at higher feed concentrations. The data for outlet concentration are more remarkable. In the tube side feed orientation, the outlet concentration of toluene ranges from 100 to 200 ppmv, showing a slight gradual increase with increasing feed inlet concentration. In contrast, the minimum outlet concentration for the shell side feed orientation exceeded 1000 ppmv, with a dramatic increase as the inlet toluene concentration increased. These differences were greater at higher flow rates (FIG. 11).

Figure 12:
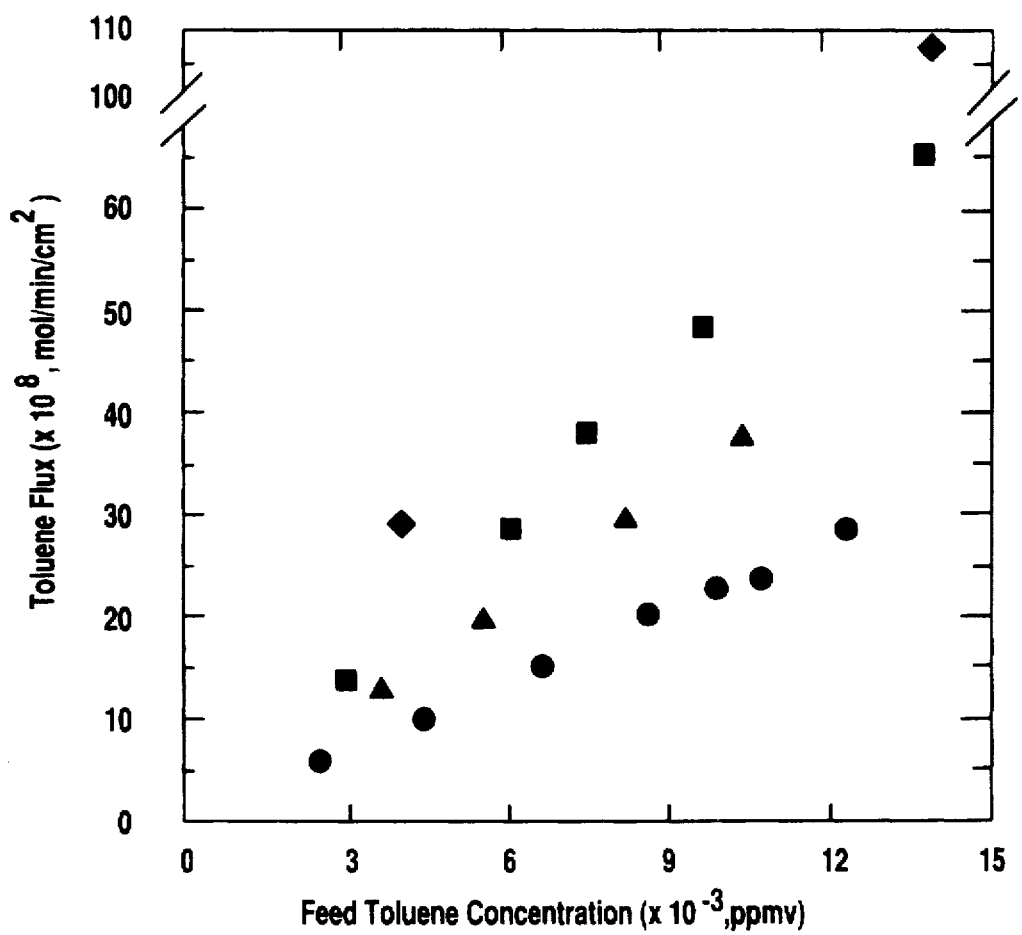
FIG. 12 shows a variation of toluene flux with inlet toluene concentration for toluene/$N_2$ feed.

Toluene flux shown in FIG. 12 increases dramatically as the feed gas flow rate increases. This is due to a rapid increase in toluene permeance at higher toluene concentrations; the latter conditions are created due to high incoming gas flow rate. The $N_2$ flux appears to decrease slightly with increasing toluene concentration. If the silicone membranes were greatly swollen by toluene, then there should have been an increase in $N_2$ flux with increasing toluene concentration due to an increased nitrogen permeance.

TABLE 4

Experimental Results for Toluene Separation from $N_2$ in Module #2 with Shell Side Feed and Vacuum in the Tube Side

| Inlet Gas Flow Rate (cc/min) | Inlet Toluene Concentration (ppmv) | Outlet Gas Flow Rate (cc/min) | Outlet Toluene Concentration (ppmv) | Percent Removal of Toluene |
|---|---|---|---|---|
| 58.7 | 4229 | 52.5 | 996 | 79 |
| 60.2 | 5184 | 54.2 | 1331 | 74 |
| 60.6 | 7003 | 54.9 | 1778 | 75 |
| 61.8 | 9526 | 55.8 | 2186 | 77 |
| 100.1 | 3800 | 94.6 | 1775 | 56 |
| 99.8 | 6116 | 94.6 | 2804 | 57 |
| 101.7 | 9301 | 96.2 | 3806 | 59 |

Figure 13:
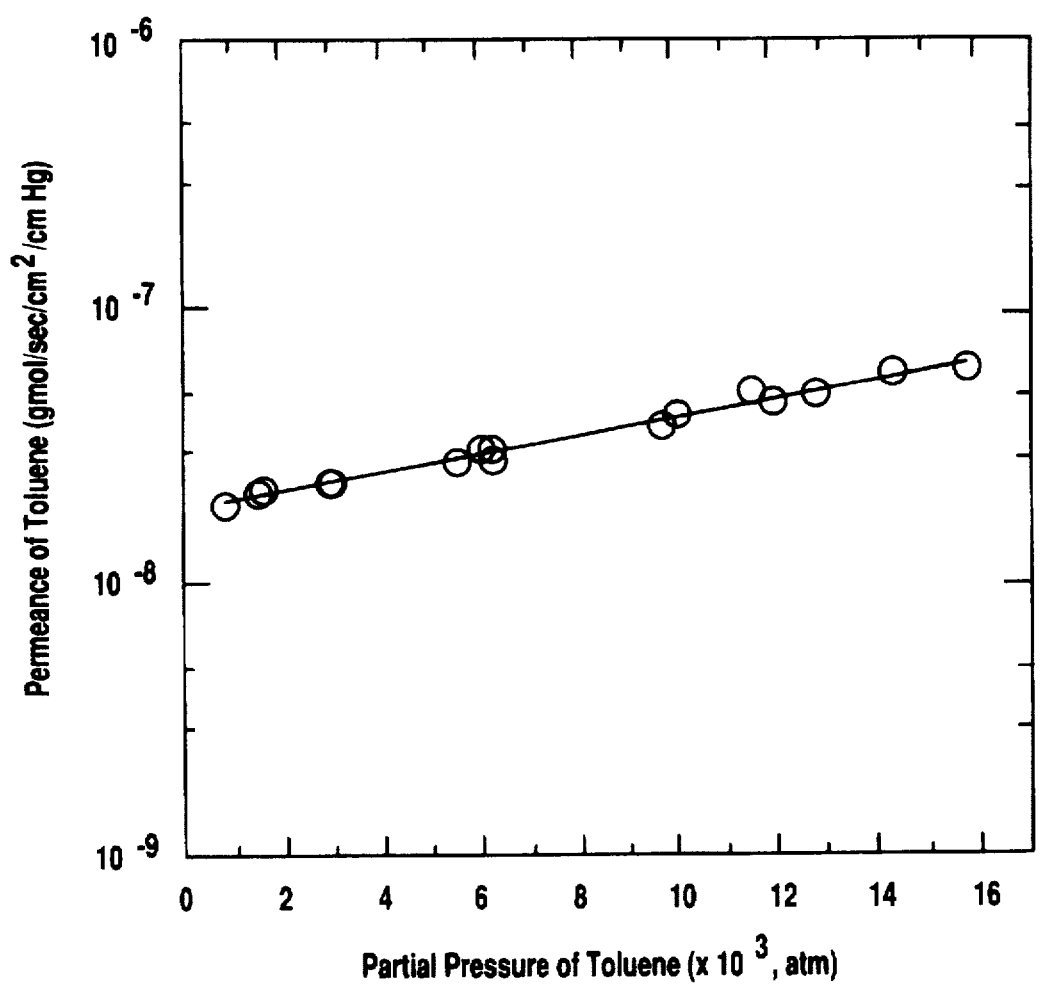
FIG. 13 shows a variation of toluene permeance with toluene concentration for toluene/$N_2$ feed.

Experiments to determine the permeance of toluene as a function of toluene concentration were carried out in module #4 having only 7.47 cm$^2$ surface area. High feed flow rates were used so that the gas composition changed less than 10% along the module. The calculated permeances are plotted against the averaged feed side concentration in FIG. 13, a semi-logarithmic plot. The relationship between ($Q_j/\delta_m$) and toluene partial pressure on feed side $P_{iF}$ (=Px) is conveniently described by an exponential relation $(Q_j/\delta_m)=a * \exp(bP_{iF})$. The regression results for a and b were found to be $185.65 \times 10^{-10}$ (gmol/sec/cm$^2$/cm Hg) and 78.81 (1/atm), respectively.

The analytical model-based result, namely Equation (1e), and the numerical model based on a complete numerical solution of the governing equations developed above were used to describe the separation performance of the coated HFM for toluene. The exponential equation described above was introduced into the equation set. The permeance of nitrogen experimentally observed was $3.8 \times 10^{-10}$ gmol/s/cm$^2$/cm Hg which was assumed to be independent of the concentration (partial pressure) of toluene for simplicity. This value was used for the numerical simulation. The results from analytical solution are shown as dashed lines and results from the numerical solution are shown as solid lines in FIGS. 8 and 9. It is clear that the experimental results were described reasonably well by both models using the experimentally obtained permeance parameters for toluene.

EXAMPLE 2

Methanol Removal

Five different flow rates, around 30, 60, 100, 150, and 300 cc/min were used for methanol separation runs in module #2. The feed methanol concentration was varied from 450 to 51,770 ppmv for many of the feed flow rates. Experimental results obtained from some of the methanol separation runs for tube side feed at around 60 cc/min are tabulated in Table 5. The corresponding results for the shell side feed are given in Table 6. The methanol percent removal and feed outlet methanol concentration for tube side feed are plotted against the feed inlet concentration in FIGS. 14, 15, and 16. FIG. 16 also contains data for percent removal and outlet concentration for the shell side feed at 60 cc/min feed flow rate. It is clear from FIG. 16 that the tube side feed operation for methanol removal is considerably superior to the shell side feed operation, other conditions remaining constant.

TABLE 5

Experimental Results for Methanol Separation from $N_2$ in Module 2 with Tube Side Feed and Vacuum in the Shell Side

| Inlet Gas Flow Rate (cc/min) | Inlet Methanol Concentration (ppmv) | Outlet Gas Flow Rate (cc/min) | Outlet Methanol Concentration (ppmv) | Percent Removal of Methanol |
|---|---|---|---|---|
| 58.1 | 4558 | 52.4 | 133 | 97.4 |
| 59.7 | 16727 | 52.5 | 159 | 99.2 |
| 59.2 | 18368 | 52.8 | 167 | 99.2 |
| 59.5 | 36378 | 52.4 | 181 | 99.6 |
| 58.6 | 51713 | 52.0 | 221 | 99.6 |
| 58.7 | 70875 | 51.7 | 247 | 99.7 |

TABLE 6

Experimental Results for Methanol Separation from $N_2$ in Module 2 with Shell Side Feed and Vacuum in the Tube Side

| Inlet Gas Flow Rate (cc/min) | Inlet Methanol Concentration (ppmv) | Outlet Gas Flow Rate (cc/min) | Outlet Methanol Concentration (ppmv) | Percent Removal of Methanol |
|---|---|---|---|---|
| 60.1 | 5893 | 54.5 | 760 | 88.3 |
| 60.6 | 20794 | 54.9 | 2565 | 88.8 |
| 59.7 | 39466 | 53.7 | 6895 | 84.3 |
| 60.9 | 51034 | 54.2 | 8237 | 85.6 |
| 58.4 | 57690 | 52.2 | 8590 | 86.7 |
| 64.4 | 75063 | 57.8 | 12015 | 85.6 |

Figure 14:
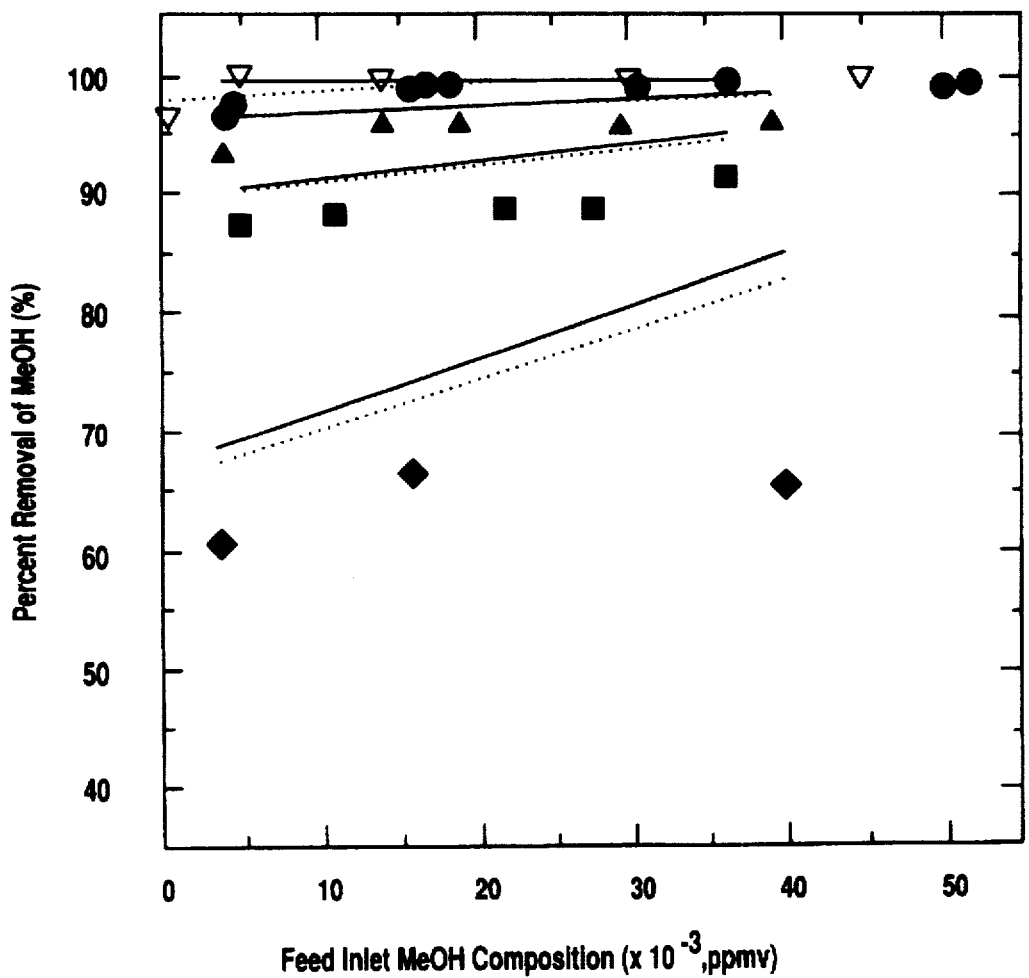
FIG. 14 shows a variation of percent removal of methanol with feed composition for MeOH/$N_2$.
Figure 15:
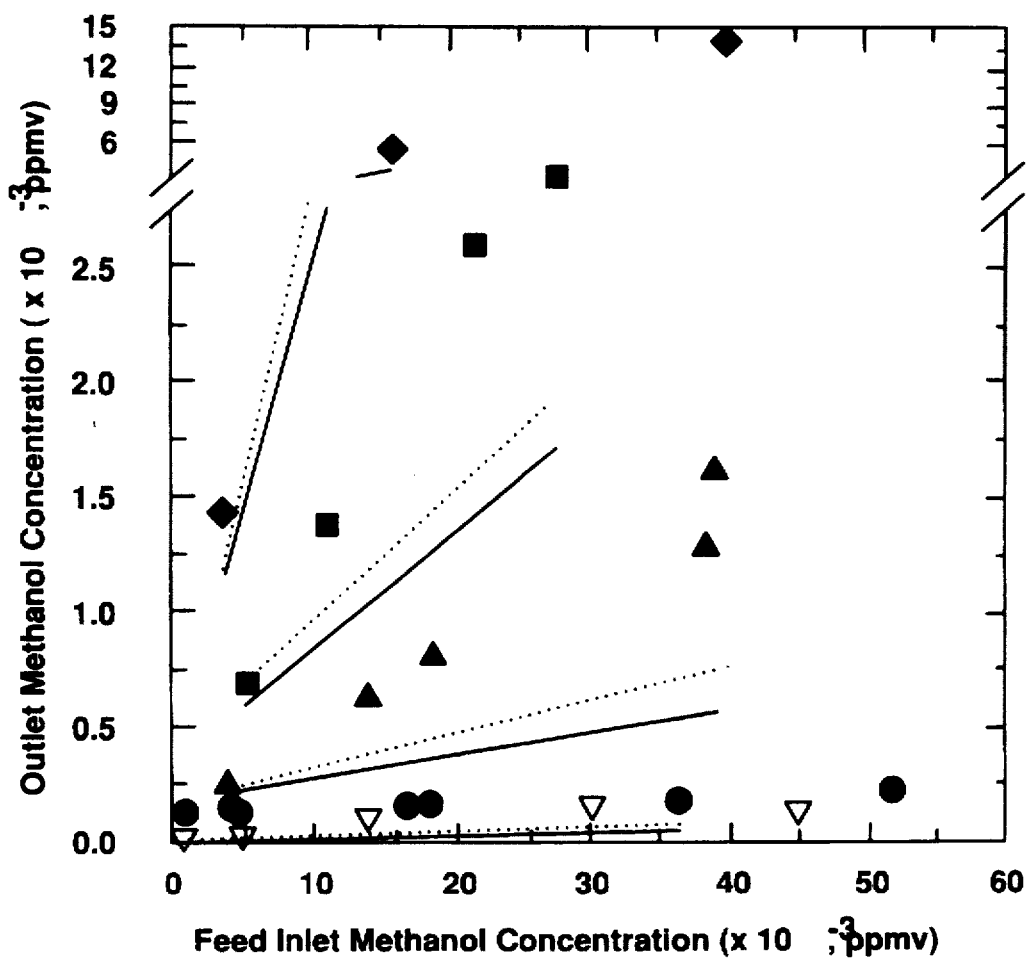
FIG. 15 shows a variation of outlet methanol concentration with inlet vapor concentration for methanol/$N_2$ feed.
Figure 16:
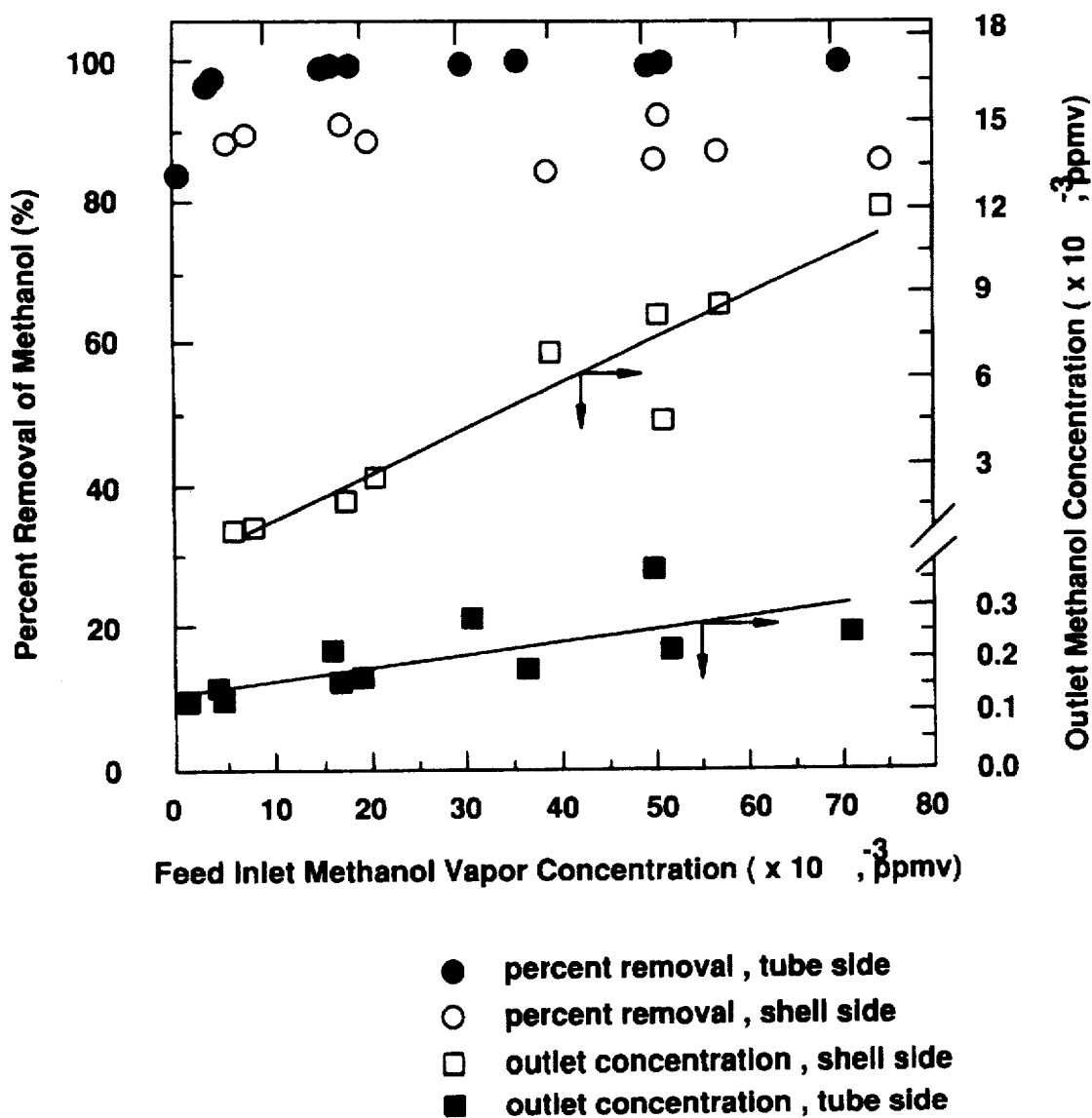
FIG. 16 shows a variation of percent removal and outlet concentration of methanol with inlet vapor concentration at a gas flow rate of 60–65 cc/min with tube side and shell side feed of methanol/$N_2$.

FIGS. 14, 15, and 16 illustrate the actual methanol separation behavior for various flow rates. Except for one run having a feed methanol concentration of 730 ppmv and flow rate of 60 cc/min, FIG. 14 shows that more than 96% of methanol was removed for a feed gas flow rate below 60 cc/min, i.e., 1.2 cc/min/fiber. For a feed flow rate of about 30 cc/min and methanol concentration above 1,000 ppmv, 98%+ removal of methanol was achieved. The feed outlet methanol concentrations were reduced to below 400 ppmv for the whole concentration range studied for gas flow rate below 60 cc/min as seen in FIG. 15. The percent removal of methanol was reduced as the feed flow rate was increased; the same phenomenon was observed in toluene removal experiments. It was also observed that the percent removal of methanol was reduced as the feed concentration was reduced at feed flow rates of 60 and 150 cc/min. However, at feed flow rates of around 300 cc/min, the percent removal of methanol did not vary greatly with the feed concentration.

The permeance of methanol was obtained from experiments run on module #4 as was done with toluene. An exponential fit of the methanol permeance data yielded values for a and b of $267.7 \times 10^{-10}$ (gmol/sec/cm$^2$/cmHg) and 27.52 (1/atm), respectively. These parameters were introduced into the complete numerical solution, and the results, shown by solid lines, in FIGS. 14 and 15. The analytical solution is shown in dotted line. Both solutions fit the experimental data quite well.

At the same feed flow rate, the flux of $N_2$ decreased considerably as the feed methanol concentration increased for every feed flow rate. This decrease in $N_2$ flux cannot be ascribed to a decrease in $N_2$ partial pressure, but rather must be due to a decrease in $N_2$ permeance. The separation factor of methanol over $N_2$ was, therefore, significantly increased as the feed concentration of methanol was increased. The same phenomenon was also observed for toluene, although the separation factor of toluene did not increase as much as with methanol.

Experimental separation was also tested with acetone and methylene chloride. Both VOC separations were studied only in the tube side feed mode employing fewer feed gas flow rates and vapor compositions.

EXAMPLE 3

Acetone

Figure 17:
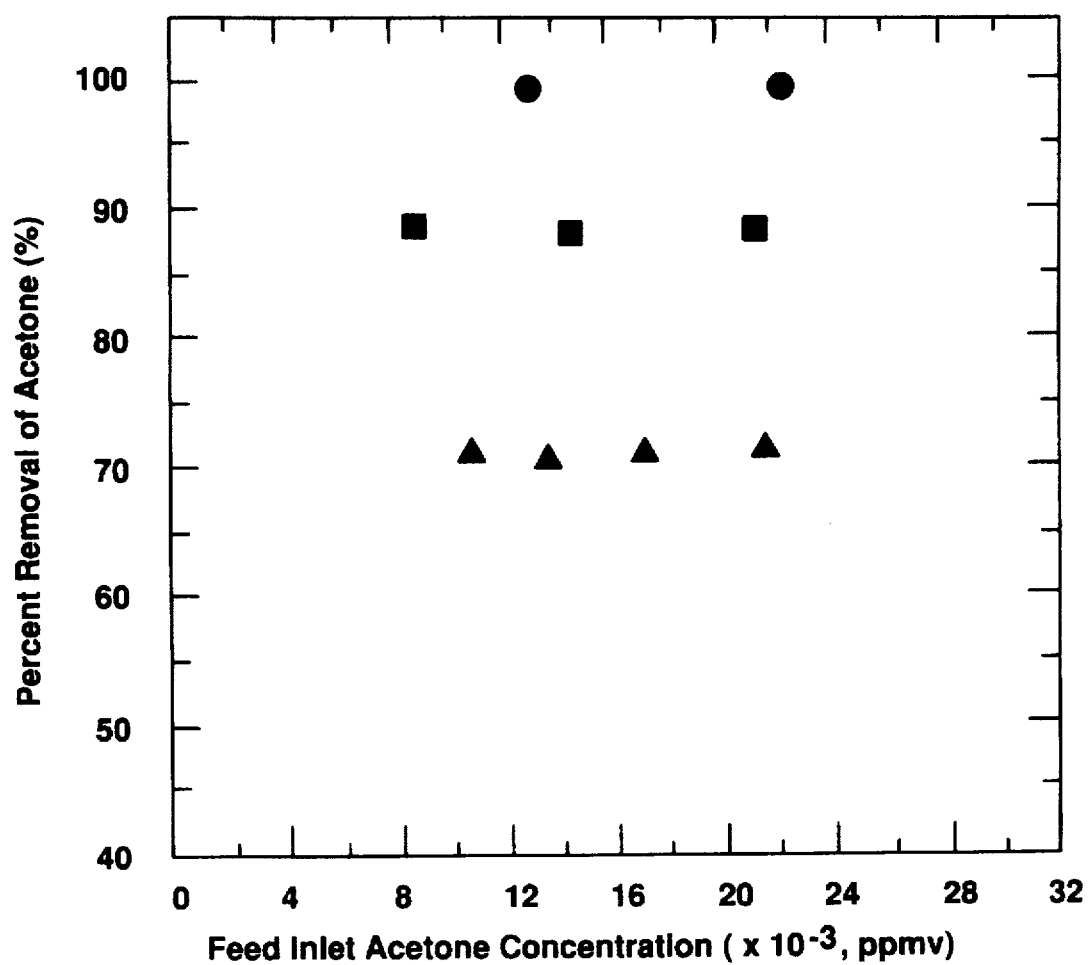
FIG. 17 shows a variation of percent removal of acetone with acetone/$N_2$ feed.
Figure 18:
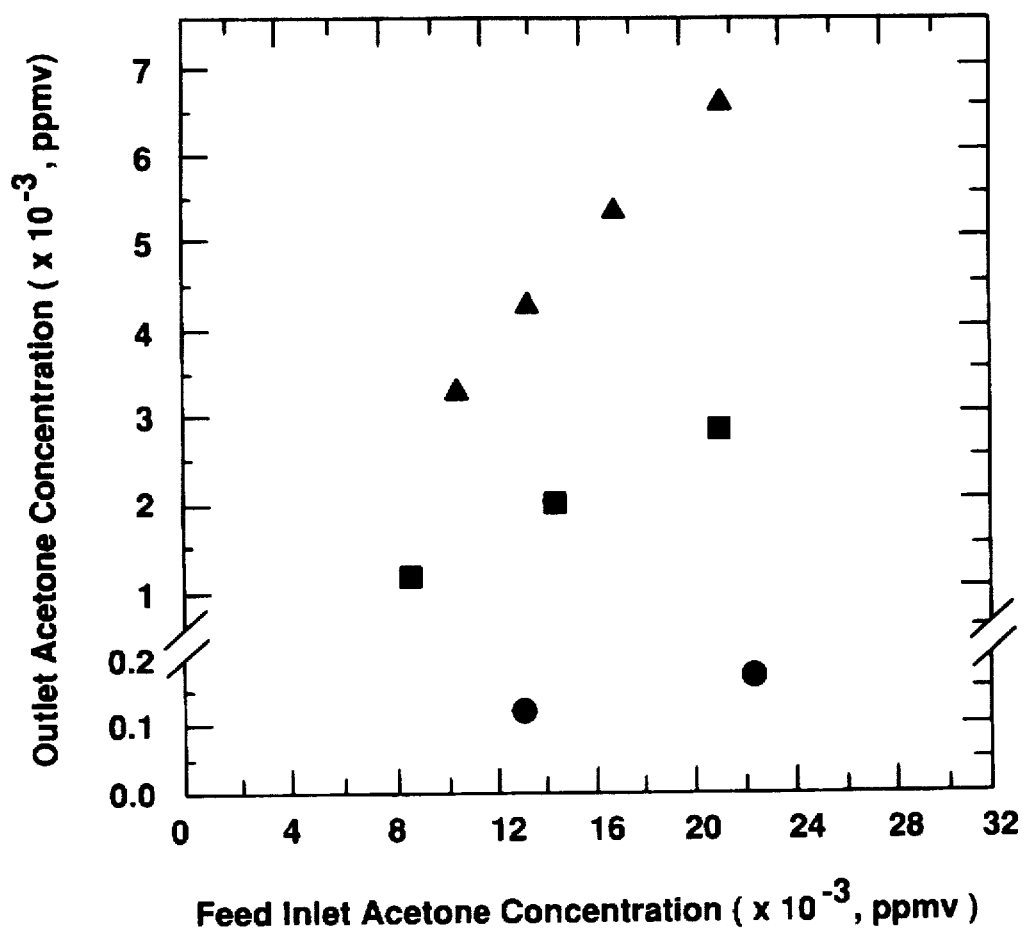
FIG. 18 shows a variation of outlet acetone composition with inlet acetone composition of an acetone/$N_2$ feed.

Table 7 provides the feed outlet acetone concentrations and percent removals at three feed flow rates around 29, 60 and 100 cc/min. The acetone concentration was varied from 8740 to 22430 ppmv. It is obvious that very high percent removal of acetone (99%) can be achieved at low feed flow rates (29 cc/min 0.6 cc/min/fiber). However, the loss of $N_2$ is somewhat higher compared to that at higher feed gas flow rates. These results are shown graphically in FIG. 17; it appears that percent removal of acetone is relatively unaffected by the feed concentration level of acetone. Correspondingly, the feed outlet concentration of acetone increases almost linearly with an increase in feed inlet concentration as seen in FIG. 18. The rate of increase is sharper at higher flow rates.

TABLE 7

Experimental Results for Acetone Separation from $N_2$ in Module 2 with Tube side Feed and Vacuum in the Shell Side

| Inlet Gas Flow Rate (cc/min) | Inlet Acetone Concentration (ppmv) | Outlet Gas Flow Rate (cc/min) | Outlet Acetone Concentration (ppmv) | Percent Removal of Acetone |
|---|---|---|---|---|
| 29 | 13101 | 21.9 | 119 | 99.3 |
| 29.1 | 22434 | 21.8 | 167 | 99.4 |
| 58.9 | 8736 | 50.9 | 1151 | 88.6 |
| 59.7 | 14608 | 53.1 | 1976 | 87.9 |
| 59.9 | 21304 | 53.1 | 2841 | 88.2 |
| 100.3 | 10729 | 93.7 | 3306 | 71.2 |
| 101.2 | 13633 | 94.1 | 4287 | 70.7 |
| 101.1 | 17284 | 94.4 | 5355 | 71.1 |
| 100.5 | 21626 | 93.6 | 6616 | 71.5 |

The acetone flux increased strongly with the acetone feed inlet concentration; the separation factor also increased, but less so. The behavior of $N_2$ flux with increasing acetone vapor concentration is similar to that observed with methanol, namely, it decreases. This decrease is much greater than that attributable to an increase in acetone concentration.

EXAMPLE 4

Methylene Chloride

Figure 19:
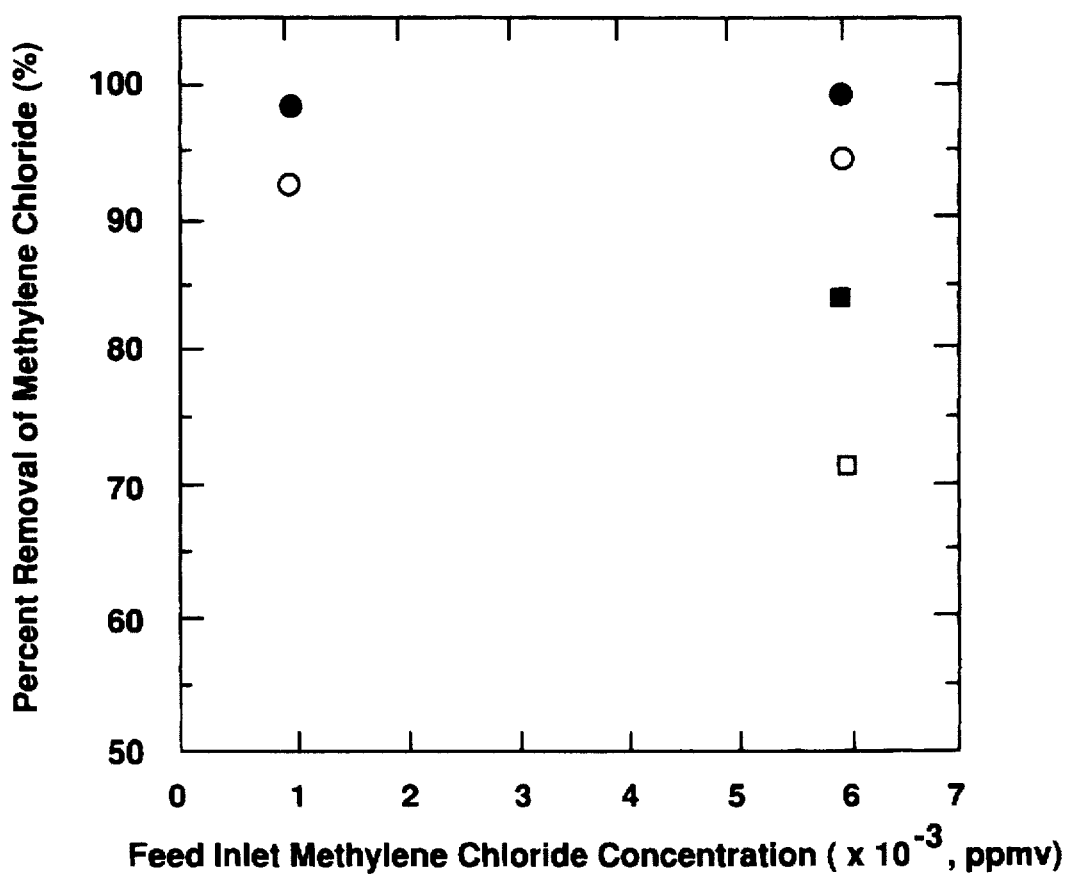
FIG. 19 shows a variation of percent removal of methylene chloride with methylene chloride/$N_2$ feed composition.
Figure 20:
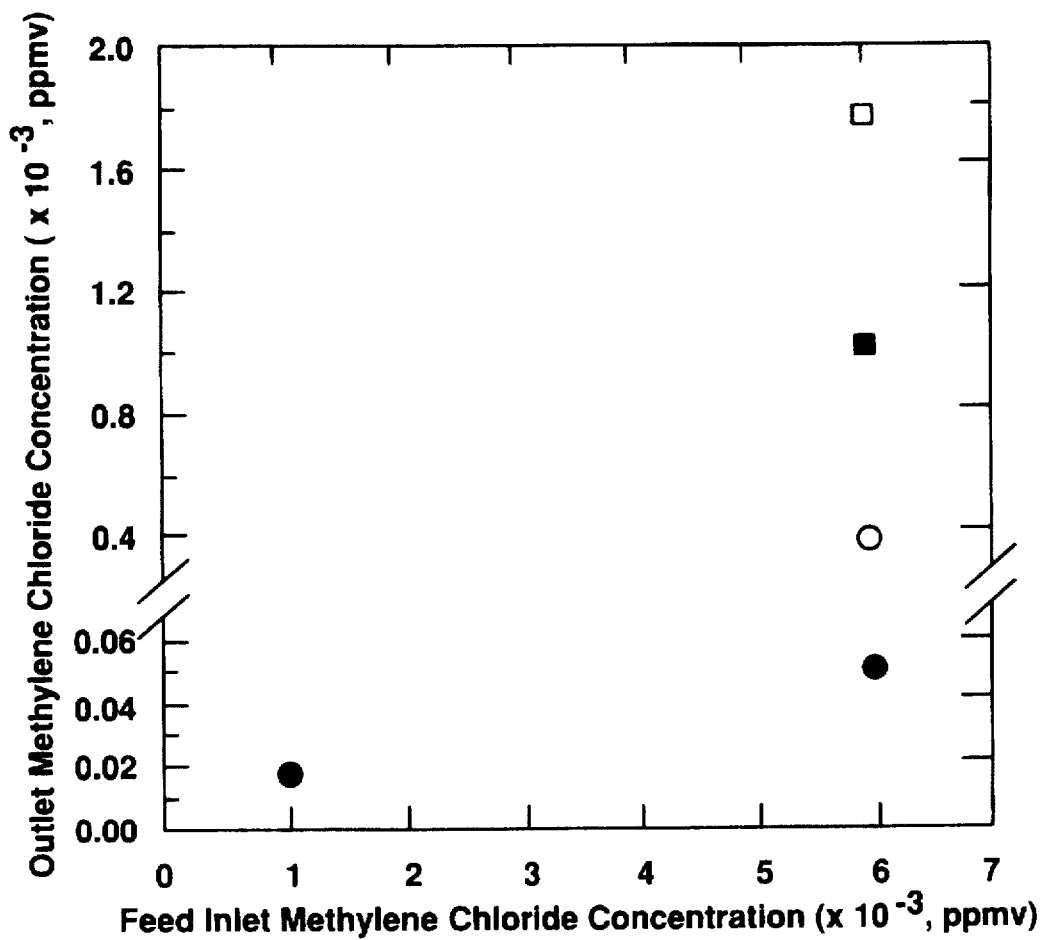
FIG. 20 shows a variation of outlet methylene chloride concentration with methylene chloride/$N_2$ feed vapor concentration.

The experimental results for methylene chloride runs are provided briefly in Table 8 for two inlet concentrations 998 and 6000 ppmv. These results are also illustrated in FIGS. 19 and 20 as percent removal and outlet concentrations respectively. It appears that 98%+ removal of methylene chloride is easily achieved at both concentrations for gas flow rates as high as 1.2 cc/min/fiber. Methylene chloride flux increase with concentration and flow rate, a be havior observed with other VOCs. The separation factor varied between 23 and 50 which is quite satisfactory for the process envisaged. As in the experiments above, $N_2$ flux through the membrane and, therefore, $N_2$ permeance, decreases with increasing VOC concentration.

TABLE 8

Experimental Results for Methylene Chloride Separation from $N_2$ in Module 2 with Tube side Feed and Vacuum in the Shell Side

| Inlet Gas Flow Rate (cc/min) | Inlet Methylene Chloride Concentration (ppmv) | Outlet Gas Flow Rate (cc/min) | Outlet Methylene Chloride Concentration (ppmv) | Percent Removal of Methylene Chloride |
|---|---|---|---|---|
| 61.6 | 998 | 56.7 | 17 | 98.4 |
| 97.2 | 998 | 91.9 | 79 | 92.5 |
| 57.2 | 6000 | 52.0 | 50 | 99.2 |
| 97.5 | 6000 | 92.0 | 371 | 94.2 |
| 155.3 | 6000 | 150.0 | 1005 | 83.8 |
| 241.7 | 6000 | 235.6 | 1762 | 71.4 |

EXAMPLE 5

Air Feed Instead of Nitrogen

The performances of the membrane system when $N_2$ is replaced by air in the gaseous stream fed through the fiber bores and vacuum on the shell side are illustrated in Table 9 for the VOC, toluene. A comparison of these results with those given in, say, Table 3 for a $N_2$-based system, shows essentially no difference except for slightly higher loss of air. This is expected since $O_2$ has 2-3 times higher permeance than that of $N_2$ through the silicone rubber. As a result, the outlet gas flow rates are somewhat lower compared to the case of $N_2$-based feed gas.

TABLE 9

Experimental Results for Toluene Separation from Air in Module 2 with Tube side Feed and Vacuum in the Shell Side

| Inlet Gas Flow Rate (cc/min) | Inlet Toluene Concentration (ppmv) | Outlet Gas Flow Rate (cc/min) | Outlet Toluene Concentration (ppmv) | Percent Removal of Toluene |
|---|---|---|---|---|
| 59.5 | 3532 | 51.6 | 100 | 97.2 |
| 59.5 | 6020 | 51.4 | 127 | 97.9 |
| 60.3 | 7942 | 52.2 | 145 | 98.2 |
| 60.2 | 12055 | 51.9 | 189 | 98.4 |
| 98.9 | 3404 | 91.3 | 303 | 91.1 |
| 100.3 | 6162 | 91.6 | 438 | 92.9 |
| 100.0 | 8532 | 91.5 | 587 | 93.1 |
| 100.5 | 10592 | 91.9 | 838 | 92.1 |
| 153.1 | 7603 | 143.3 | 1268 | 83.3 |

Table 10 illustrates the performance of module #2 in removing hexane from $N_2$. The inlet hexane concentration was rather low at 1062 ppmv. Reasonable separation was achieved.

TABLE 10

Experimental Results for Hexane Separation from $N_2$ in Module 2 with Tube side Feed and Vacuum in the Shell Side

| Inlet Gas Flow Rate (cc/min) | Inlet Hexane Concentration (ppmv) | Outlet Gas Flow Rate (cc/min) | Outlet Hexane Concentration (ppmv) | Percent Removal of Hexane |
|---|---|---|---|---|
| 12.5 | 1062 | 7.1 | 49 | 97.4 |
| 28.1 | 1062 | 22.8 | 280 | 78.5 |
| 57.1 | 1062 | 51.6 | 547 | 55.5 |

EXAMPLE 7

Multicomponent Feed

Several experiments were carried out with a multicomponent feed containing acetone (1010 ppmv), methanol (780 ppmv), and toluene (900 ppmv). The results are shown in Table 11. Although the mixture was very dilute and the feed gas flow rates used were quite high (around 100 and 160 cc/min.), highly satisfactory results were obtained. Lower gas flow rates would likely have yielded greater removal efficiency.

decrease in pore diameter creates, for example, a conical shape to the pore. At higher VOC concentrations, there will be pore condensation of the VOC in such conical pores. This will facilitate VOC permeation by imposing a pure VOC liquid next to the silicone membrane while $N_2$ now has to diffuse through an additional VOC liquid layer before it reaches the silicone skin 24.

Additionally, in the tube side feed configuration used, the permeated gas on the vacuum side experienced very little pressure drop. On the other hand, with shell side feed, the permeated gas encounters considerable flow pressure drop through the polypropylene substrate pores and in flowing

TABLE 11

Experimental Results for Simultaneous Separations of Multiple VOCs (Acetone, Methanol and Toluene) from $N_2$ in Module 2 with Tube side Feed and Vacuum in the Shell Side

| Inlet Gas Flow Rate (cc/min) | Outlet Gas Flow Rate (cc/min) | Acetone Concn. (ppmv) In | Acetone Concn. (ppmv) Out | Acetone Percent Removal | Methanol Conc. (ppmv) In | Methanol Conc. (ppmv) Out | Methanol Percent Removal | Toluene Conc. (ppmv) In | Toluene Conc. (ppmv) Out | Toluene Percent Removal |
|---|---|---|---|---|---|---|---|---|---|---|
| 96.9 | 91.7 | 1010 | 302 | 71.7 | 780 | 146 | 82.3 | 900 | 129 | 86.4 |
| 157.0 | 151.5 | 1010 | 474 | 54.7 | 780 | 207 | 74.4 | 900 | 226 | 75.8 |

SUMMARY OF EXPERIMENTS

These experiments have shown that the use of the hollow fiber module (HFM) having an ultrathin nonporous plasma polymerized silicone coating is very effective in removing VOCs such as toluene, methanol, methylene chloride, and acetone from feed gas streams, such as $N_2$ and air. A very small HFM having a length of 25 cm with 50 fibers can remove 97–98% of the VOC from a feed stream at 60 cc/min. In the case of acetone, a lower gas flow rate was used to achieve this level of efficiency. At a lower flow rate of 30 cc/min, 98%+ removal is achieved easily. The HFM is especially suitable for high feed inlet VOC concentrations. The concentration of methanol in a feed stream of 50,000 ppmv methanol and 60 cc/min flow rate was reduced to 221 ppmv, thus achieving a greater than 200-fold decrease in methanol concentration and 99.6% VOC removal. Replacing $N_2$ by air merely reduces the selectivity somewhat since $O_2$ is more permeable than $N_2$ through the membrane. Passing the feed gas through the fiber bore and pulling a vacuum on the shell side results in a much better separation performance compared to passing the feed gas on the shell side.

In all of the experiments, removal, the $N_2$ flux decreased considerably with an increase in the VOC feed concentration. The decreased $N_2$ flux was of much greater magnitude than could be attributed to the insignificant decrease in $N_2$ partial pressure as a result of the increased VOC concentration. This is quite unexpected since literature such as Baker (U.S. Pat. No. 4,553,983) indicates that membrane swelling at higher concentrations would increase $N_2$ permeance substantially.

It is hypothesized that at the location 32 in the composite membrane 22 where the silicone coating 24 has blocked the pores 33 in the microporous polypropylene substrate 29, there is a gradual reduction in the pore size due to plasma polymerization in the pores leading to pore closure at the top (or outer) pore surface, as illustrated in the inset of FIG. 4 for a symmetric substrate, although the pore size reduction may also occur on asymmetric substrates. The gradual through the fiber bores. This reduces the vacuum-based driving force available across the silicone membrane coating and results in lower separation.

The experimental results have demonstrated that the novel silicone-coated hollow fiber membrane-based separation is highly efficient in removing selectively VOCs like toluene, methanol, methylene chloride and acetone from a nitrogen or air stream at atmospheric pressure under the appropriate operating configuration, namely, tube side feed and shell side vacuum.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

Various references are cited herein, the disclosures of which are incorporated herein by reference in their entirety.

What is claimed is:

1. A method for selectively removing a component from a multicomponent gas/vapor mixture using a membrane fractionation system, said system having: a feed chamber which contains the gas/vapor mixture; at least one porous membrane having a first side which contacts the gas mixture in said feed chamber, and having a second side; at least one nonporous membrane having a first side which contacts said second side of said porous membrane, and a second side, said nonporous membrane having a permeability selective to the component; an exit chamber connected to said second side of said nonporous membrane; and an evacuation means connected to said exit chamber for evacuating said exit chamber of the component; the method comprising the steps of:

a. introducing the multicomponent gas/vapor mixture which contains the component into said feed chamber;

b. contacting the gas/vapor mixture in said feed chamber with said first side of said at least one porous membrane; and c. evacuating said exit chamber.

2. A method for removing a component from a gas/vapor mixture as in claim 1 wherein said evacuation means includes a sweep gas means.

3. A method for removing a component from a gas/vapor mixture as in claim 1 wherein said evacuation means includes a vacuum means.

4. A method for removing a component from a gas/vapor mixture as in claim 2 or 3 wherein said evacuation means further includes a condensing means.

5. A method for removing a component from a gas/vapor mixture as in claim 4 the method further comprising a step of condensing the component exiting said exit chamber.

6. A method for removing a component from a gas/vapor mixture as in claim 1 wherein said at least one porous membrane has a pore size which promotes the adsorption and condensation of the component within said porous membrane.

7. A method for removing a component from a gas/vapor mixture as in claim 6 wherein the pore size which promotes the condensation of the component within said porous membranes is substantially formed by the occlusion of pores by said nonporous membrane.

8. A method for removing a component from a gas/vapor mixture as in claim 1 wherein said at least one porous membrane is permselective with respect to the component.

9. A method for removing a component from a gas/vapor mixture as in claim 8 wherein said at least one porous membrane has a pore size which promotes the adsorption and/or condensation of the component within said porous membrane.

10. A method for removing a component from a gas/vapor mixture as in claim 9 wherein said pore size which promotes the condensation of the component within said porous membranes is substantially formed by the occlusion of pores by said nonporous membrane.

11. A method for removing a component from a gas/vapor mixture as in claim 10 wherein said at least one porous membrane comprises at least one hydrophobic microporous membrane.

12. A method for removing a component from a gas/vapor mixture as in claim 11 wherein said at least one hydrophobic microporous membrane is substantially composed of a material selected from the group of polysulfone, polyetherimide, polyvinylidene fluoride, polyamide, polypropylene, polymethylpentene, and polytetrafluoroethylene.

13. A method for removing a component from a gas/vapor mixture as in claim 12 wherein said at least one hydrophobic microporous membrane comprises at least one asymmetric hydrophobic microporous membrane.

14. A method for removing a component from a gas/vapor mixture as in claim 13 wherein said at least one asymmetric hydrophobic microporous membrane further comprises at least one hollow porous tube having a lumen and a membrane thickness; wherein said first side of said microporous membrane comprises an inner surface of said hollow porous tube; wherein said second side of said microporous membrane comprises an outer surface of said hollow porous tube; wherein said feed chamber corresponds to the lumen of said at least one hollow porous tube; and wherein said exit chamber surrounds said at least one hollow porous tube and said at least one nonporous membrane in a shell-and-tube arrangement, such that said exit chamber is said shell.

15. A method for removing a component from a gas/vapor mixture as in claim 14 wherein said component is a volatile organic compound.

16. A method for removing a component from a gas/vapor mixture as in claim 15 wherein said pore size near the second side of said porous membrane is in the range of 6 to 50 Å.

17. A method for removing a component from a gas/vapor mixture as in claim 12 wherein said at least one hydrophobic microporous membrane comprises at least one symmetric hydrophobic microporous membrane.

18. A method for removing a component from a gas/vapor mixture as in claim 11 wherein said at least one nonporous membrane comprises a nonporous rubbery skin membrane.

19. A method for removing a component from a gas/vapor mixture as in claim 18 wherein said at least one nonporous rubbery skin membrane is substantially comprised of a thermoplastic material.

20. A method for removing a component from a gas/vapor mixture as in claim 19 wherein said at least one nonporous rubbery skin membrane is plasma polymerized onto said second side of said at least one porous membrane.

21. A method for removing a component from a gas/vapor mixture as in claim 20 wherein said thermoplastic material is substantially composed of a material selected from the group of polydimethylsiloxane (silicone rubber), nitrile rubber, neoprene rubber, silicone-polycarbonate copolymers, fluoroelastomers, polyurethane, polyvinylehloride, polybutadiene, polyolefin elastomers, polyesters, and polyethers.

22. A method for removing a component from a gas/vapor mixture as in claim 19 wherein said thermoplastic material is comprised of ultrathin plasma polymerized nonporous silicone rubber.

23. A membrane fractionation gas removal system for selectively removing a component from a multicomponent gas/vapor mixture, comprising:

a. a feed chamber which contains the gas/vapor mixture;

b. at least one porous membrane having a first side which contacts the gas/vapor mixture in said feed chamber, and a second side;

c. at least one nonporous membrane having a first side which contacts said second side of said at least one porous membrane, and a second side, said nonporous membrane having a permeability selective to the component;

d. an exit chamber connected to said second side of said at least one nonporous membrane such that the component exiting said nonporous membrane enters said exit chamber; and e. an evacuation means connected to said exit chamber for evacuating the component from within said exit chamber;

wherein the component is transported through said at least one porous membrane, adsorbed out of the gas/vapor multicomponent gas mixture onto the pore surface of said porous membrane, transported through said at least one nonporous membrane, and transported and into said exit chamber.

24. A membrane fractionation gas removal system according to claim 23, wherein said evacuation means includes a vacuum means for maintaining a vacuum pressure in said exit chamber.

25. A membrane fractionation gas removal system according to claim 24, wherein said evacuation means further includes a condensing means for condensing the component which exits said exit chamber.

26. A membrane fractionation gas removal system according to claim 23, wherein said at least one porous membrane has a pore size which promotes the condensation of the component within said porous membrane.

27. A membrane fractionation gas removal system according to claim 23, wherein said at least one porous membrane is permselective with respect to the component.

28. A membrane fractionation gas removal system according to claim 27, wherein said at least one porous membrane are provided with a plurality of pores having a pore size which promotes the condensation of the component within the pores.

29. A membrane fractionation gas removal system according to claim 28, wherein the pore size which promotes the condensation of the component within the porous membranes is substantially formed by the occlusion of said pores by said nonporous membrane.

30. A membrane fractionation gas removal system according to claim 29, wherein said at least one porous membrane comprises at least one hydrophobic microporous membrane.

31. A membrane fractionation gas removal system according to claim 30, wherein said at least one hydrophobic microporous membrane is substantially composed of a material selected from the group of polysulfone, polyetherimide, polyvinylidene fluoride, polyamide, polypropylene, polymethylpentene, and polytetrafluoroethylene.

32. A membrane fractionation gas removal system according to claim 31, wherein said at least one porous membrane comprises at least one asymmetric hydrophobic microporous membrane.

33. A membrane fractionation gas removal system according to claim 32, wherein said at least one asymmetric hydrophobic microporous membrane further comprises at least one hollow porous tube having a lumen and a membrane thickness; wherein said first side of said microporous membrane comprises an inner surface of said hollow porous tube; wherein said second side of said microporous membrane comprises an outer surface of said hollow porous tube; wherein said feed chamber corresponds to the lumen of the at least one hollow porous tube; and wherein said exit chamber surrounds said at least one hollow porous tube and said at least one nonporous membrane in a shell-and-tube arrangement, such that said exit chamber is said shell.

34. A membrane fractionation gas removal system according to claim 33, wherein the component is a volatile organic compound.

35. A membrane fractionation gas removal system according to claim 34, wherein the pore size near said second side of said porous membrane is in the range of 6 to 50 Å.

36. A membrane fractionation gas removal system according to claim 31, wherein said at least one porous membrane comprises at least one symmetric hydrophobic microporous membrane.

37. A membrane fractionation gas removal system according to claim 30, wherein said at least one nonporous membrane comprises at least one nonporous rubbery skin membrane.

38. A membrane fractionation gas removal system according to claim 37, wherein said at least one nonporous rubbery skin membrane is fabricated from a thermoplastic material.

39. A membrane fractionation gas removal system according to claim 38, wherein said at least one nonporous rubbery skin membrane is plasma polymerized onto said second side of said at least one porous membrane.

40. A membrane fractionation gas removal system according to claim 39, wherein said at least one nonporous rubbery skin membrane is substantially composed of a material selected from the group of polydimethylsiloxane (silicone rubber), nitrile rubber, neoprene rubber, silicone-polycarbonate copolymers, fluoroelastomers, polyurethane, polyvinylchloride, polybutadiene, polyolefin elastomers, polyesters, and polyethers.

41. A membrane fractionation gas removal system according to claim 40, wherein said at least one nonporous rubbery skin membrane comprises ultrathin plasma polymerized nonporous silicone rubber.

42. The combination of the membrane fractionation gas removal system according to claim 23 with a vaporizable solute-transfer system for transferring a vaporizable solute from a gas-feed mixture to an absorbent liquid, the solute-transfer system comprising:

(a) an absorption module;

(b) a porous membrane located within and connected to said absorption module, said porous membrane being wettable by an absorbent liquid, said porous membrane dividing said absorption module into a gas feed chamber and an absorbent chamber, said absorption module having a gas-feed mixture inlet port and a gas-feed mixture outlet port which communicate with said gas-feed chamber and an absorbent liquid inlet port and an absorbent liquid outlet port which communicate with said absorbent chamber;

(c) a regeneration module; and (d) a nonporous material that is permeable to the vaporizable solute located within and connected to said regeneration module, said nonporous material dividing said regeneration module into a liquid absorbent chamber and a vacuum atmosphere chamber, said regeneration module having a liquid absorbent inlet port and a liquid absorbent outlet port which communicate with said liquid absorbent chamber and a vacuum outlet port which communicates with said vacuum chamber;

wherein the component evacuated from said membrane fractionation gas removal system is capable of being fed into said gas-feed mixture inlet port of said vaporizable solute-transfer system.

43. A membrane fractionation gas removal system for removing a component from a multicomponent gas/vapor mixture, comprising:

a. a plurality of hydrophobic porous hollow fibers, each fiber having a lumen, an inner surface surrounding the lumen, and an outer surface, said fibers being comprised of a polymeric material which is permselective to the component;

b. a nonporous rubbery skin membrane fixedly disposed on the outer surface of said plurality of hydrophobic porous hollow fibers, said membrane being substantially fabricated with a thermoplastic material which is permselective to said component; and c. an exit chamber surrounding the plurality of hydrophobic porous hollow fibers in a shell-and-tube arrangement, such that said exit chamber is said shell;

wherein the gas/vapor mixture is introduced into said lumen of said plurality of hydrophobic porous hollow fibers, whereby the component is transported radially through said hollow fibers, adsorbed out of the gas/vapor mixture onto the pore surface of said hollow fibers and transported through said nonporous rubbery skin membrane into said exit chamber.

44. A membrane fractionation gas removal system according to claim 43, further comprising a vacuum means connected to said exit chamber for maintaining a vacuum pressure in said exit chamber.

45. A membrane fractionation gas removal system according to claim 44 wherein said plurality of hydrophobic porous hollow fibers are further comprised of a hydrophobic microporous membrane material.

46. A membrane fractionation gas removal system according to claim 45, wherein said porous hollow fibers have a pore size which promotes condensation of the component within said hollow fibers.

47. A membrane fractionation gas removal system according to claim 46, wherein said hydrophobic microporous membrane material is selected from the group consisting of: polysulfone, polyetherimide, polyvinylidene fluoride, polyamide, polypropylene, polymethylpentene, and polytetrafluoroethylene.

48. A membrane fractionation gas removal system according to claim 47, wherein said hydrophobic microporous membrane material is asymmetric hydrophobic microporous membrane material.

49. A membrane fractionation gas removal system according to claim 48, wherein said nonporous rubbery skin membrane substantially occludes pores on said outer surface of said porous hollow fibers thereby forming a pore size near said outer surface of said porous hollow fibers which promotes condensation of the component within said hollow fibers.

50. A membrane fractionation gas removal system according to claim 49, wherein said nonporous rubbery skin membrane is plasma polymerized onto said hollow fibers.

51. A membrane fractionation gas removal system according to claim 50, wherein said nonporous rubbery skin membrane is fabricated of a material selected from the group consisting of polydimethylsiloxane (silicone rubber), nitrile rubber, neoprene rubber, silicone-polycarbonate copolymers, fluoroelastomers, polyurethane, polyvinylchloride, polybutadiene, polyolefin elastomers, polyesters, and polyethers.

52. A membrane fractionation gas removal system according to claim 51, wherein said nonporous rubbery skin membrane is ultrathin plasma polymerized nonporous silicone rubber.

53. A membrane fractionation gas removal system according to claim 52, wherein the component is a volatile organic compound.

54. A membrane fractionation gas removal system according to claim 53, wherein said condensing pore sizes are in the range of 6 to 50 Å.

55. A membrane fractionation gas removal system according to claim 54, further comprising a condensing means for condensing the component which enters said exit chamber.

56. A membrane fractionation gas removal system according to claim 47, wherein said hydrophobic microporous membrane material is symmetric hydrophobic microporous membrane material.

57. A membrane fractionation gas removal system according to claim 43, wherein the gas/vapor mixture includes at least one component which is significantly adsorbed by said porous hollow fibers and transportable through said nonporous rubbery skin membrane and at least one other component which is not preferentially adsorbed by said porous hollow fibers and which is not readily transportable through said nonporous rubbery skin membrane.

58. A membrane fractionation gas removal system according to claim 43 wherein the multicomponent gas/vapor mixture further comprises one or more gaseous components selected from a group including hydrogen, helium, nitrogen, oxygen, carbon dioxide, air, and argon.

59. The combination of the membrane fractionation gas removal system according to claim 43 with a solute transfer system comprising:

(a) an absorption module containing a plurality of microporous hollow fibers through the lumen of which a gas containing volatile organic compounds can pass and over the exterior of which a liquid absorbant can contact the exterior of said microporous hollow fibers; and b) a plurality of nonporous hollow fibers forming hollow tubes in which a vacuum is applied to one surface and said liquid absorbent containing volatile organic compounds is on the opposite surface;

wherein said absorption module contains a pressure difference control means; and wherein the component evacuated from said membrane fractionation gas removal system is capable of being fed into the lumen of said plurality of microporous hollow fibers of said solute-transfer system.

* * * * *